US007044364B2

(12) United States Patent
Ooki

(10) Patent No.: US 7,044,364 B2
(45) Date of Patent: May 16, 2006

(54) IMAGE FORMING APPARATUS AND IMAGE FORMING METHOD

(75) Inventor: Makoto Ooki, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/789,156

(22) Filed: Feb. 27, 2004

(65) Prior Publication Data

US 2004/0262378 A1    Dec. 30, 2004

(30) Foreign Application Priority Data

Jun. 27, 2003   (JP)   ............................. 2003-185448

(51) Int. Cl.
*G06F 17/00* (2006.01)
(52) U.S. Cl. ................................... 235/375
(58) Field of Classification Search ................ 235/375, 235/462.41, 462.11; 900/6, 18; 358/426, 358/448, 518–521; 382/162, 116, 175, 16, 382/181, 210
See application file for complete search history.

(56) References Cited

U.S. PATENT DOCUMENTS

| | | | | |
|---|---|---|---|---|
| 5,199,081 A | * | 3/1993 | Saito et al. ................. | 382/116 |
| 5,231,482 A | * | 7/1993 | Murakami et al. .......... | 358/500 |
| 5,729,360 A | * | 3/1998 | Kita et al. .................... | 358/500 |
| 5,768,403 A | * | 6/1998 | Suzuki et al. ................ | 358/2.1 |
| 5,886,334 A | * | 3/1999 | D'Entremont et al. ...... | 235/380 |
| 6,039,434 A | * | 3/2000 | Moroney ..................... | 347/43 |
| 6,057,942 A | * | 5/2000 | Sato ........................... | 358/435 |
| 6,192,152 B1 | * | 2/2001 | Funada et al. .............. | 382/199 |
| 6,381,376 B1 | * | 4/2002 | Toyoda ....................... | 382/284 |
| 6,473,202 B1 | * | 10/2002 | Kanata et al. ............... | 358/2.1 |
| 6,486,981 B1 | * | 11/2002 | Shimura et al. ............. | 358/500 |
| 6,661,921 B1 | * | 12/2003 | Tanioka ...................... | 382/190 |
| 6,707,564 B1 | * | 3/2004 | Fujimoto et al. ........... | 358/1.14 |
| 6,769,617 B1 | * | 8/2004 | Mochizuki ............. | 235/462.14 |
| 6,836,572 B1 | * | 12/2004 | Ishiga et al. ................. | 382/300 |
| 6,948,654 B1 | * | 9/2005 | Shioda et al. ............... | 235/375 |

FOREIGN PATENT DOCUMENTS

| | | |
|---|---|---|
| JP | 07-030752 | 1/1995 |
| JP | 09-172544 | 6/1997 |
| JP | 2000-134472 A | 5/2000 |
| JP | 2001-053975 A | 2/2001 |

\* cited by examiner

*Primary Examiner*—Thien M. Le
*Assistant Examiner*—Edwyn Labaze
(74) *Attorney, Agent, or Firm*—Frishauf, Holtz, Goodman & Chick, P.C.

(57) ABSTRACT

An apparatus for forming an arbitrary image including one of chromatic and/or achromatic characters, a photograph, and halftone dots, which enables a formation of color images of chromatic and achromatic character areas, a photographic area, and a screened halftone area after area identification processing and which facilitates a visual check of whether the area identification processing was correctly performed on the basis of the color images, comprising: an image processing means 36 for identifying character areas, a photographic area, and a screened halftone area of an arbitrary image upon receiving an input of image information constituting the image and for performing image processing including determining whether each of the character areas is chromatic or achromatic and an image forming means 39 for forming and outputting images with colors varying with the area type of the chromatic and achromatic character areas, the photographic area, the screened halftone area in an identification result output chart on the basis of the image information image-processed by the image processing means 36.

21 Claims, 13 Drawing Sheets

ORIGINAL IMAGE

WHITE: PORTION NOT IDENTIFIED AS HALFTONE DOTS

GRAY: PORTION IDENTIFIED AS HALFTONE DOTS

IMAGE FORMING APPARATUS AND IMAGE FORMING METHOD

BACKGROUND OF THE INVENTION

1. Field of the Invention

The present invention relates to an image forming apparatus and an image forming method which is preferably applicable to a color printer, a color digital copying machine, and a complex machine having an image area identification and adjustment function for identifying image areas and adjusting image data.

2. Related Background Art

In recent years, there have often been cases in which tandem color printers, tandem copying machines, or complex machines are used. Each of these color image forming apparatuses comprises exposure means, developing devices, and photosensitive drums for yellow (Y), magenta (M), cyan (C), and black (BK) colors, and an intermediate transfer belt and a fixing device.

For example, the Y-color exposure means forms an electrostatic latent image on the photosensitive drum on the basis of arbitrary image information. The developing device forms a color toner image with Y-color toner adhering to the electrostatic latent image on the photosensitive drum. The photosensitive drum transfers the toner image to the intermediate transfer belt. Regarding other M, C, and BK colors, the same processing is performed. The color toner image transferred to the intermediate transfer belt is transferred to paper and then fixed by the fixing device. To form an optimum color image using such type of color image forming apparatus, it is necessary to identify a photographic image, a screened halftone image, or a character area on the basis of image data of a document and to perform image processing based on a result of the identification before the image formation.

Japanese Unexamined Patent Publication (Kokai) No. Hei09-172544 (1997) discloses an image processing apparatus for identifying a type of a target image in FIG. 2 on page 2. According to the image processing apparatus, an identification means identifies a type of an image based on image data when identifying a type of image data obtained from a document reader (scanner). The image data is processed according to a result of the image type identified by the identification means. When executing a magnification/reduction process, the processing means modifies an identification operation of the identification means. In other words, an identification parameter of the processing means is variable according to reading conditions of the document reader. This enables a precise identification of the type of the target image according to processing conditions and reading conditions of the target image.

Japanese Unexamined Patent Publication (Kokai) No. 2000-134472 discloses a digital image forming apparatus for forming an electrostatic latent image by converting document information to electric signals and developing the electrostatic latent image in FIG. 2 on page 3. The digital image forming apparatus comprises a threshold modification means, which modifies a threshold for classifying halftone dots in the document into a character part and an image part to a character processing side or to an image processing side when setting the threshold. In other words, the setting is made by modifying the threshold for classifying halftone dots into an image and a character. This increases sharpness of the character part and realizes a smooth and natural copy image in the halftone-dot image part, matching the document or a user's intention.

Japanese Unexamined Patent Publication (Kokai) No. Hei07-030752 (1995) discloses an image area identifying apparatus for identifying a type of an image in FIG. 2 on page 2. The image area identifying apparatus comprises a photographic image area identification means, a screened halftone image area identification means, and a character area identification means, wherein the image area identifying apparatus finds an average density for each block from image data, finds a density difference between the average density obtained for each block and an average density of adjacent blocks, and identifies a photographic image area, a screened halftone image area, or a character area on the basis of the density difference. This enables a character image area to be discriminated from a non-character image area from a mixed image area including a character image, a photographic image, and a screened halftone image.

Japanese Unexamined Patent Publication (Kokai) No. 2001-053975 discloses an image printing method of printing a document in black and white by using a color document in FIG. 1 on page 9. The image printing method comprises identifying a character part, a photographic part, and a screened halftone part by using signals of R-, G-, and B-color components obtained by reading the color document with a color scanner and combining the signals of the respective colors on the basis of a result of the identification, thereby achieving a variety of printing expressions.

The conventional color image forming apparatuses, however, have the following problems when identifying a photographic image, a screened halftone image, or a character area from image data of a chromatic or achromatic document and performing image processing based on a result of the identification.

(1) In the above four literatures of prior art technology, the image processing means is provided with an area identification function. In the present state of the technology, however, it is not easy to check that the area identification processing was correctly performed with the image processing means. Generally, an image identification parameter is often set on an operating screen easy to operate for a user.

To check whether the image identification parameter was correctly set on the operating screen, it is necessary to read a document image and to check, for example, that a character area is not tinged with any color or that a screened halftone image is formed in a screened halftone area, or the like.

(2) As stated above, unless the image identification parameter is appropriate depending on the document, it is necessary to repeat color adjustment. Furthermore, there is the possibility that it takes a lot of time for color adjustment, thereby deteriorating the operationality at the color adjustment.

(3) Differences in scanner characteristics between individual copying machines may cause different results of identification when the same document is read. For example, in a machine having a different modulation transfer function (MTF), colored characters are output instead of black characters or a screened halftone area is not identified as a screened halftone image due to a difference in an identification result of the chromatic area or the screened halftone area. Therefore, a detection characteristic of the screened halftone image or a detection characteristic of chromatic color identification varies with machines and it may lead to image deterioration.

SUMMARY OF THE INVENTION

The present invention has been provided to resolve these problems of the conventional technologies. Therefore, it is an object of the present invention to provide an image forming apparatus and an image forming method, which enable a formation of color images of chromatic and achromatic character areas, a photographic area, and a-screened halftone area after area identification processing and which facilitate a visual check of whether the area identification processing was correctly performed on the basis of the color images.

To achieve the above object, according to one aspect of the present invention, there is provided an image forming apparatus for forming an arbitrary image including one of chromatic and/or achromatic characters, a photograph, and halftone dots, comprising: first identification means for identifying input image information as a character area, a photographic area, or a screened halftone area; output means for outputting a plurality of identification signals for each area of the identified image information; and recording means for forming images with different colors on the basis of the plurality of identification signals.

According to another aspect of the present invention, there is provided an image forming apparatus, comprising: second identification means for identifying input image information as a chromatic character area or an achromatic character area; output means for outputting a plurality of identification signals for each area of the identified image information; and recording means for recording (forming) images with different colors on the basis of the plurality of identification signals.

According to the image forming apparatus of the present invention, it further comprises: image processing means for identifying a character area, a photographic area, and a screened halftone area upon receiving an input of an image information constituting an image and for performing image processing including a process of determining whether the character area is chromatic or achromatic; and image formation means for forming and outputting images with colors varying with the area type of the chromatic and achromatic character areas, the photographic area, and the screened halftone area to a visual medium on the basis of the image information image-processed by the image processing means.

According to the image forming apparatus of the present invention, when forming an arbitrary image including one of chromatic and/or achromatic characters, a photograph, and halftone dots, the image processing means receives an input of image information constituting the image, identifies a character area, a photographic area, and a screened halftone area of the image, and further determines whether the character area identified there is chromatic or achromatic. Thereafter, the image processing means performs image processing, for example, according to the chromatic and achromatic character areas, the photographic area, and the screened halftone area of the image. With acceptance on this point, the image formation means forms and outputs images with colors varying with the area type of the chromatic and achromatic character areas, the photographic area, and the screened-halftone area to a visual medium on the basis of the image information image-processed by the image processing means.

Therefore, it is possible to treat the chromatic and achromatic character areas, the photographic area, and the screened halftone area, identified according to the area type by the image processing means, as color images. Furthermore, the color images formed with different colors on the visual medium to be output from the image formation means represent the chromatic and achromatic character areas, the photographic area, and the screened halftone area. The color images facilitate a visual check of whether the image processing means correctly performed the area identification processing.

Thereby, unless a user determines that the area identification processing has been correctly performed, an identification reference value for the area identification can be adjusted on the spot. Unless the user determines that the chromatic or achromatic color identification processing has been correctly performed, an identification reference value for the color identification can be adjusted on the spot.

According to still another aspect of the present invention, there is provided an image forming method for forming an image including one of chromatic and/or achromatic characters, a photograph, and halftone dots, comprising: inputting image information constituting an image; identifying a character area, a photographic area, and a screened halftone area of the input image; determining whether the character area identified in the above is chromatic or achromatic; performing image processing according to the chromatic and achromatic character areas, the photographic area, and the screened halftone area identified in the above; and forming and outputting images with colors varying with the area type of the chromatic and achromatic character areas, the photographic area, and the screened halftone area to a visual medium on the basis of image information after the image processing.

According to the image forming method of the present invention, it is possible to treat the chromatic and achromatic character areas, the photographic area, and the screened halftone area identified according to the area type as color images. Furthermore, the color images formed with different colors on the visual medium represent the chromatic and achromatic character areas, the photographic area, and the screened halftone area. These color images facilitate a visual check of whether the area identification processing was correctly performed.

DETAILED DESCRIPTION OF THE PREFERRED EMBODIMENTS

The preferred embodiments of an image forming apparatus and an image forming method of the present invention will now be described in detail hereinafter with reference to the accompanying drawings.

(1) First Embodiment

Figure 1:
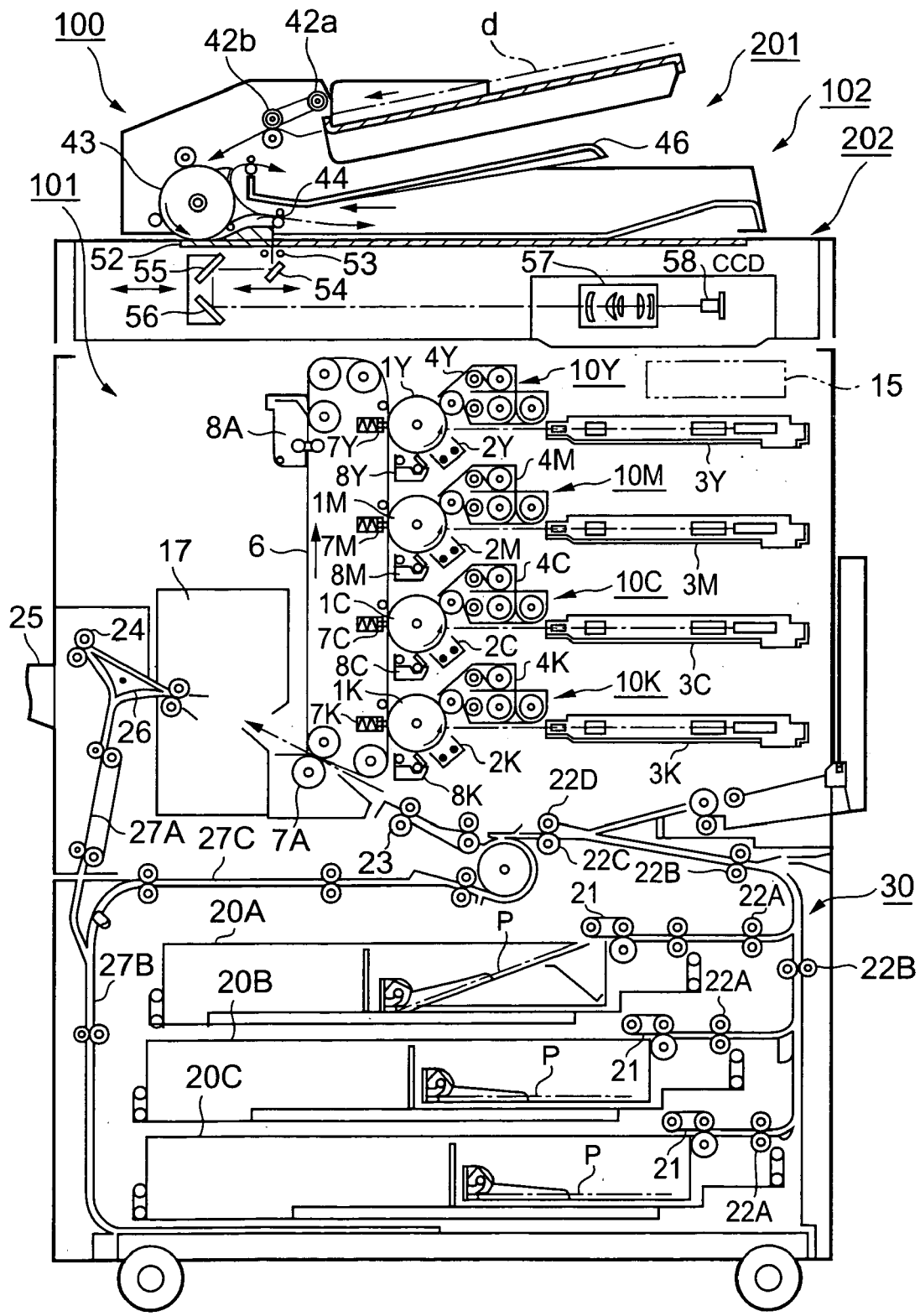
FIG. 1 shows an illustrative configuration of a color image forming apparatus 100 as an embodiment of the present invention.

Referring to FIG. 1, there is shown an illustrative configuration of a color image forming apparatus 100 as an embodiment of the present invention.

The invention according to this embodiment comprises an image formation means for identifying a character area, a photographic area, and a screened halftone area of an arbitrary image and for forming and outputting images with colors varying with the area type of the chromatic and achromatic character areas, the photographic area, and the screened halftone area to a visual medium on the basis of image information after image processing including a process of determining whether the identified character area is chromatic or achromatic, so as to enable a formation of color images of the chromatic and achromatic character areas, the photographic area, and the screened halftone area after the area identification processing and to facilitate a visual check of whether the area identification processing was correctly performed on the basis of the color images.

The color image forming apparatus 100 shown in FIG. 1 forms a color image on desired paper P by reading image information on a document d including a chromatic or achromatic character image, a photographic image, and a screened halftone image and superimposing colors based on the image formation data Y, M, C, and BK after image processing.

The color image forming apparatus 100 comprises an image forming apparatus body 101 and a document reading unit 102. At the top of the image forming apparatus body 101, there is attached a document reading unit 102 comprising an automatic document feeder (ADF) 201 and a document image scanning exposure device 202. The document reading unit 102 is an example of a document reading means.

The ADF 201 comprises a document mounting unit 41, a roller 42a, a roller 42b, a roller 43, a converting roller 44, a converting unit 45, and a discharge tray 46. The document reading unit 102 has a first platen glass 51, a second platen glass 52, a light source 53, mirrors 54, 55, and 56, a focusing optical unit 57, a CCD imaging device 58, and an optical drive unit, which is not shown.

Figure 2:
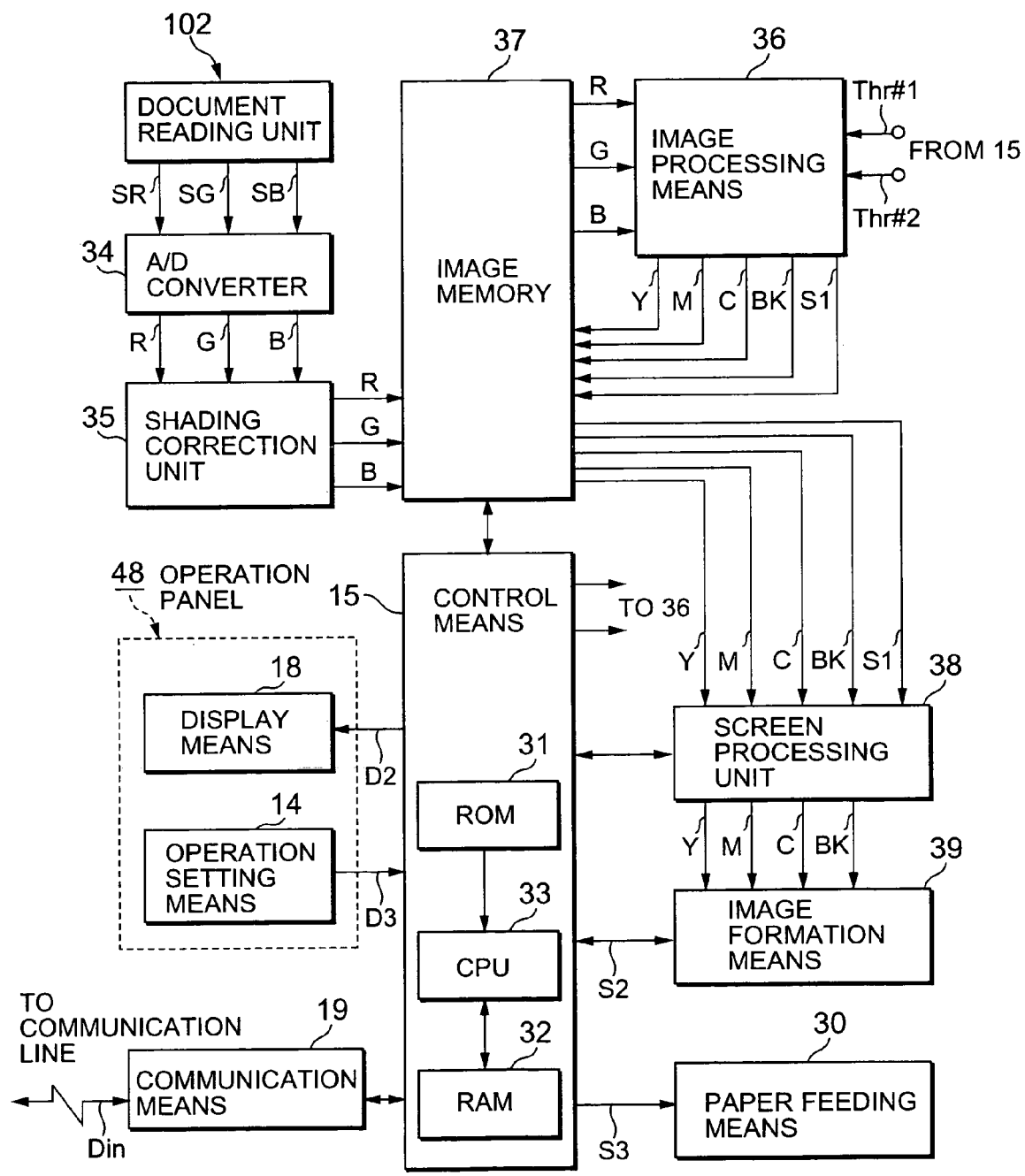
FIG. 2 is a block diagram showing an illustrative internal configuration of a control system for the color image forming apparatus 100.

The document d placed on the document mounting unit of the ADF 201 is conveyed by a conveying means. An optical system of the document image scanning exposure device 202 makes a scanning exposure on an image surface of the document d and the CCD imaging device 58 outputs image signals obtained by reading image information from the document d. For the image signals photoelectrically transferred by the CCD imaging device 58, image processing means 36 as shown in FIG. 2 performs analog processing, A/D conversion, shading correction, image compression processing, and the like, thereby causing the image signals to be digital image data R, G, and B. Thereafter, the image data R, G, and B go through predetermined image processing. The image formation data Y, M, C, and BK after the image processing are sent to image writing units (exposure means) 3Y, 3M, 3C, and 3K as an example of the image formation means.

The ADF 201 has an automatic double-sided document conveying means. The ADF 201 continuously reads a large number of sheets of document d fed from the document mounting unit at a time and stores the contents of the document in an image memory or the like (electronic RDH function). The electronic RDH function is convenient for copying a large number of sheets of document by using a copying function or for transmitting a large number of sheets of document d by using a facsimile function.

The image forming apparatus body 101, which is referred to as a tandem color image forming apparatus, comprises a plurality of image forming units 10Y, 10M, 10C, and 10K forming the image formation means, an endless intermediate transfer belt 6, a paper feed and conveying means including a re-feed mechanism (ADU mechanism), and a fixing device 17 for fixing toner images.

The image forming unit 10Y for forming yellow (Y) color images has a photosensitive drum 1Y, a Y-color charging means 2Y arranged around the photosensitive drum 1Y, an exposure means 3Y, a developing means 4Y, and a cleaning means 8Y for an image forming member. The image forming unit 10M for forming magenta (M) color images has a photosensitive drum 1M, an M-color charging means 2M, an exposure means 3M, a developing means 4M, and a cleaning means 8M for an image forming member.

The image forming unit 10C for forming cyan (C) color images has a photosensitive drum 1C, a C-color charging means 2C, an exposure means 3C, a developing means 4C, and a cleaning means 8C for an image forming member. The image forming unit 10K for forming black (BK) color images has a photosensitive drum 1K, a BK-color charging means 2K, an exposure means 3K, a developing means 4K, and a cleaning means 8K for an image forming member.

The charging means 2Y and the exposure means 3Y, the charging means 2M and the exposure means 3M, the charging means 2C and the exposure means 3C, and the charging means 2K and the exposure means 3K form a latent image formation means. The developing means 4Y, 4M, 4C, and 4K performs reverse development by applying a developing bias generated by superimposing an AC voltage on a DC voltage having the same polarity (a negative polarity in this embodiment) as a polarity of consumed toner. The intermediate transfer belt 6 is rotatably supported with suspended around a plurality of rollers.

The following describes an outline of the image forming process. The images having the corresponding colors formed by the image forming units 10Y, 10M, 10C, and 10K are sequentially transferred on the rotating intermediate transfer belt 6 by primary transfer rollers 7Y, 7M, 7C, and 7K to which there is applied a primary transfer bias (not shown) having a reverse polarity (a positive polarity in this embodiment) to a polarity of consumed toner (primary transfer), by which composite color image (Color image: Color toner image) is formed. The color image is transferred from the intermediate transfer belt 6 to paper P.

The paper P in paper cassettes 20A, 20B, and 20C is fed by a feed-out roller 21 and a feeding roller 22A, which are provided for each of the paper cassettes 20A, 20B, and 20C. The paper P is then conveyed to a secondary transfer roller 7A via conveying rollers 22B, 22C, and 22D and a registration roller 23, and the color images are transferred together to one side (surface) of the paper P (secondary transfer).

A fixing device 17 fixes the images transferred to the paper P. The paper P is then held tight by a discharging roller 24 and placed on a discharge tray 25 outside the apparatus. Image forming member cleaning means 8Y, 8M, 8C, and 8K remove transfer residual toner remaining on the peripheral surface of the photosensitive drums 1Y, 1M, 1C, and 1K after the transfer. Thereafter, the apparatus enters the next image formation cycle.

For a double-sided image formation, an image is formed on one side (surface) of the paper P and the paper P discharged from the fixing device 17 is deviated from the sheet discharging path by a branching means 26. The paper P then passes through a lower cyclical path for sheet passing 27A and is reversed by passing through a reverse conveying path 27B, which is a re-feed mechanism (ADU mechanism). Thereafter, it passes through a re-feed conveying unit 27C and then merges into the sheet discharging path at a feeding roller 22D. The lower cyclical path for sheet passing 27A, the reverse conveying path 27B, the re-feed conveying unit 27C, and the feeding roller 22D form a paper feed and conveying means.

The paper P reversed and conveyed is further conveyed to the secondary transfer roller 7A again via the registration roller 23, where color images (color toner images) are transferred together to the other side (rear surface) of the paper P. The fixing device 17 fixes the color images transferred on the paper P. The paper P is then held tight by the discharging roller 24 and placed on the discharge tray 25 outside the apparatus. On the other hand, the intermediate transfer belt cleaning means 8A removes residual toner on the intermediate transfer belt 6, which separated the paper P by curvature, after the transfer of the color images to the paper P using the secondary transfer roller 7A.

In the above image formation, it is preferable to use thin paper of 52.3 to 63.9 kg/m$^2$ (1,000 pieces), plain paper of 64.0 to 81.4 kg/m$^2$ (1,000 pieces), thick paper of 83.0 to 130.0 kg/m$^2$ (1,000 pieces), and super thick paper of 150.0 kg/m$^2$ (1,000 pieces) or so as paper P, to set a linear velocity to approximately 80 to 350 mm/sec, and to set a temperature to approximately 5 to 35° C. and a humidity to approximately 15 to 85% as environmental conditions. As for a thickness (paper thickness) of paper P, paper of 0.05 to 0.15 mm or so is used.

Referring to FIG. 2, there is shown a block diagram of an illustrative internal configuration of a control system of the color image forming apparatus 100. The color image forming apparatus 100 in FIG. 2 forms an image of a document d including a chromatic or achromatic character image, a photographic image, and a screened halftone image. The color image forming apparatus 100 comprises a control means 15, a communication means 19, a paper feed means 30, an analog-digital converter (hereinafter, referred to as an A/D converter) 34, a shading correction unit 35, an image memory 37, a screen processing unit 38, an image formation means 39, an operation panel 48, and a document reading unit 102.

The document reading unit 102 is connected to the A/D converter 34. The A/D converter 34 is connected to an output stage of a CCD imaging device 58, where analog image signals SR, SG, and SB are A/D-converted and image data R, G, and B for digital R, G, and B colors are output. The image data R, G, and B form an image of the document d. The A/D converter 34 is connected to a shading correction unit 35, where the image data R, G, and B are corrected by shading correction. The shading correction unit 35 is connected to the image memory 37, where the corrected image data R, G, and B or color-converted image formation data Y, M, C, and BK are temporarily stored (electronic RDH function). A DRAM or a hard disk is used for the image memory 37.

The image memory 37 is connected to the image processing means 36, which performs image processing including identifying the character area, the photographic area, and the screened halftone area of the document image after the R-, G-, and B-color image data R, G, and B obtained from the document reading unit 102 are input from the image memory 37 and determining whether the character area is chromatic or achromatic.

For example, the image processing means 36 receives an input of the image data R, G, and B on the document image and identifies a character area, a photographic area, and a screened halftone area of the document image on the basis of a first identification reference value (hereinafter, referred to as parameter Thr#1). In addition, it determines whether the character area is chromatic or achromatic on the basis of a second identification reference value (hereinafter, referred to as parameter Thr#2). It then performs image processing according to the chromatic or achromatic character area, the photographic area, and the screened halftone area of the document image.

The image processing means 36 performs gradation processing for image data of an achromatic character area. For example, if 8-bit image data R, G, and B is used, the image processing means 36 puts the image data of the achromatic character area into 0 to 255 gray levels to control the shading of the black character image.

Needless to say, the image processing means 36 performs filtering processing of the image data R, G, and B and gamma control of the image data R, G, and B after the filtering processing. The gamma-controlled image data R, G, and B are color-converted to image formation data Y, M, C, and K for Y, C, M, and K colors. The color-converted image formation data Y, M, C, and K go through error diffusion processing or the like (See FIG. 3).

The image processing means 36 is connected to the control means 15 in addition to the image memory 37. The control means 15 is connected to an operation setting means 14, where an area identification mode is set by an operation and where parameters can be adjusted independently. The operation in the area identification mode is an output of an identification result chart for evaluating an area identification function of the image processing means 36. The identification result chart P' shows an example of a visual medium.

The identification result chart P' includes images representing the chromatic and achromatic character areas, the photographic area, and the screened halftone area with different colors. It is intended to treat the chromatic and achromatic character areas, the photographic area, and the screened halftone area identified by the image processing means 36 as color images. The area identification mode is treated in distinction from the normal print mode.

The operation setting means 14 is operated so as to set the parameters Thr#1 and Thr#2 in the image processing means 36. In this embodiment, a user can make instructions freely on the parameters Thr#1 and Thr#2. For example, the operation setting means 14 is operated so as to output operation data D3 for use in adjusting an image quality or colored characters of the document d to the control means 15. The control means 15 adjusts the image quality of the document d by setting the parameter Thr#1 to the image processing means 36 on the basis of the operation data D3 input from the operation setting means 14 and adjusts the colored characters of the document d by setting the parameter Thr#2 likewise.

In this embodiment, the operation setting means 14 serves as an operation means and is operated to specify colors for each of the chromatic and achromatic character areas, the photographic area, and the screened halftone area. The color specification is accepted if the area identification mode is set. It is intended to facilitate a visual check of whether the area identification processing was correctly performed on the basis of the color images formed in the identification result chart P' during execution of the area identification mode.

The control means 15 is connected to a display means 18, where the first and second parameter adjustment contents are displayed on the same screen. The first parameter adjustment content means an adjusted content of the parameter Thr#1 for use in identifying one or more of the character area, the photographic area, and the screened halftone area of the document d. The second parameter adjustment content means an adjusted content of the parameter Thr#2 for use in determining whether the character area of the document d is chromatic or achromatic.

The control means 15 controls inputs and outputs to or from the image processing means 36 on the basis of a content set by the operation setting means 14. For example, the control means 15 outputs display data D2 for use in displaying the first parameter adjustment content and the second parameter adjustment content to the display means 18 and controls the display means 18 to display the parameter adjustment contents on the same screen on the basis of the display data D2.

The image memory 37 is connected to a screen processing unit 38, to which an image identification signal S1 is input. The screen processing unit 38 does not execute screen processing for the character area since screen processing causes an image blur, but executes screen processing for increasing gradations for the photographic and the screened halftone area.

The image processing means 36 is connected to the control means 15. The control means 15 makes settings of the parameter Thr#1 and the parameter Thr#2 for the image processing means 36. The control means 15 is connected to the operation setting means 14 and the display means 18. For example, the operation setting means 14 comprises a touch panel and the display means 18 comprises a liquid crystal display panel. In this embodiment, the liquid crystal display panel as the display means 18 is combined with the touch panel as the operation setting means 14 thereon, thereby achieving a graphic user interface (GUI) operation panel 48.

The control means 15 outputs the parameter Thr#1 and the parameter Thr#2 to the image processing means 36 to control inputs or outputs to or from the image processing means 36. For example, the control means 15 makes a control to display a first parameter adjustment content for use in identifying one or more of the character area, the photographic area, and the screened halftone area of the document d and a second parameter adjustment content for use in determining whether one or more of the character area, the photographic area, and the screened halftone area of the document d are chromatic or achromatic on the same screen of the operation panel 48. The operation panel 48 is operated to set the parameter Thr#1 and the parameter Thr#2. For example, the operation panel 48 adjusts an image quality of the document d by setting the parameter Thr#1 and adjusts colored characters of the document d by setting the parameter Thr#2.

The above control means 15 has a read only memory (ROM) 31, a random access memory (RAM) 32, and a central processing unit (CPU) 33. The ROM 31 stores system program data for controlling the entire image forming apparatus. The RAM 32 is used as a work memory: for example, it temporarily stores a control command or the like. Upon being turned on, the CPU 33 starts the system by reading system program data from the ROM 31 and controls the entire image forming apparatus on the basis of operation data D3 from the operation setting means 14.

Figure 6:
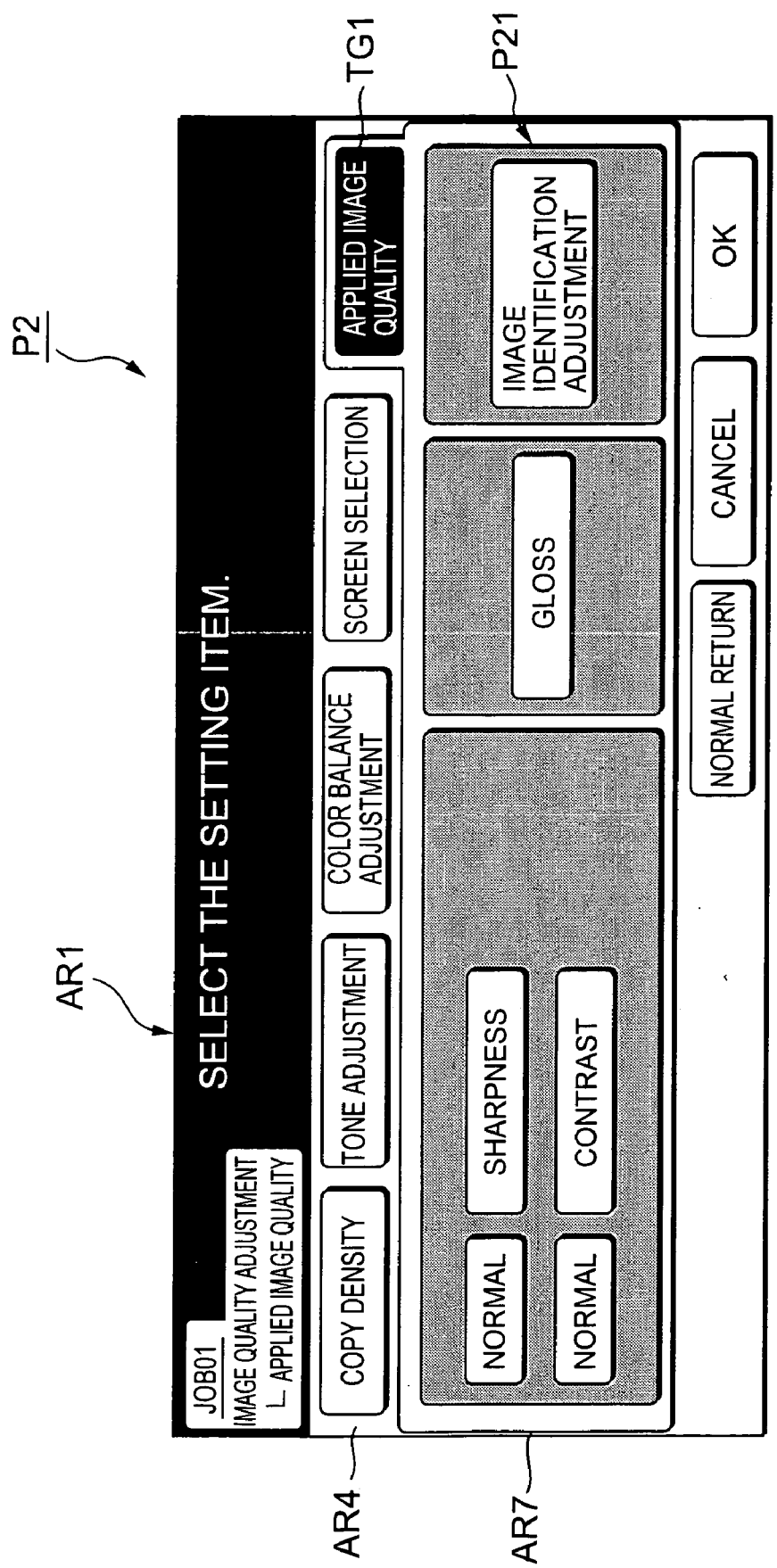
FIG. 6 is an image diagram showing an illustrative display of an image quality adjustment screen P2 on the operation panel 48.

The control means 15 is connected to an image formation means 39 comprising the image forming units 10Y, 10M, 10C, and 10K shown in FIG. 6 and operates to form a document image on the basis of the contents set by the operation panel 48. For example, the control means 15 outputs an image formation control signal S2 to the image formation means 39 to control inputs or outputs to or from the image formation means 39. The image formation means 39 sets the image formation data Y, M, C, and K image-processed by the image processing means 36 on the basis of the image formation control signal S2 and forms images with colors varying with the area type of the chromatic and achromatic character areas, the photographic area, and the screened halftone area in the identification result chart P' on the basis of the image formation data Y, M, C, and K. It is intended to facilitate a visual check of whether the area identification processing was correctly performed on the basis of the color images formed in the identification result chart P'.

The control means 15 is connected to a communication means 19 and a paper feeding means 30 besides the image formation means 39. The communication means 19 is connected to a communication line such as a LAN and is for use in communications with an external computer or the like. When the color image forming apparatus 100 is used as a printer, the communication means 19 is used to receive print data $D_{in}$ from the external computer in a print operation mode.

The paper feeding means 30 controls the paper cassettes 20A, 20B, and 20C shown in FIG. 1 on the basis of a paper feed control signal S3 in the print operation mode. For example, the paper feeding means 30 drives the feed-out roller 21 and the feeding roller 22A provided for the paper cassette 20A to let out paper P contained in the paper cassette 20A and to feed it to the image formation means 39. The paper feed control signal S3 is supplied from control means 15 to the paper feeding means 30.

Figure 3:
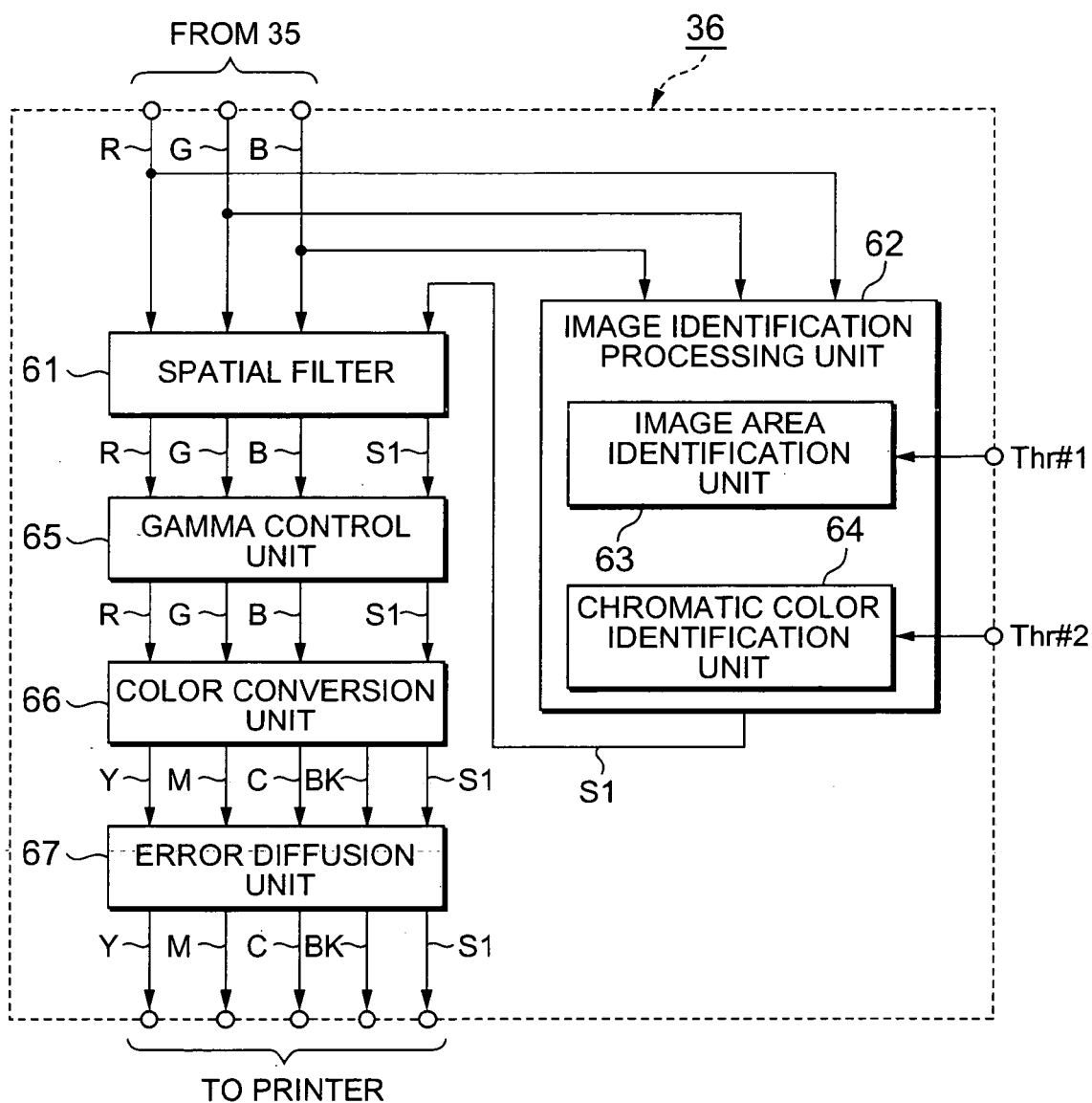
FIG. 3 is a block diagram showing an illustrative internal configuration of an image processing means 36.

Referring to FIG. 3, there is shown a block diagram of an illustrative internal configuration of the image processing means 36. The image processing means 36 in FIG. 3 comprises a spatial filter 61, an image identification processing unit 62, a gamma control unit 65, a color conversion unit 66, and an error diffusion unit 67. The image identification processing unit 62 has an image area identification unit 63 and a chromatic color identification unit 64. The image area identification unit 63 receives an input of the image data (image information) R, G, and B for R, G, and B colors obtained from the document reading unit 102 and identifies the character area, the photographic area, and the screened halftone area of the document d on the basis of the first parameter Thr#1 (For the flowchart, see FIG. 12).

The chromatic color identification unit 64 determines whether one or more of the character area, the photographic area, and the screened halftone area of the document d are chromatic or achromatic on the basis of the second parameter Thr#2. For example, the chromatic color identification unit 64 makes calculations described below. Supposing here that R, G, and B are image data; W is a variable (luminance) under calculation; a, b, and c are calculation parameters; C is a result of identification; and Thr#2 is an identification reference value, the identification result C is obtained by the following formulas (1) and (2):

$$W=(R+G+B)/3 \quad (1)$$

$$C=a\times|R-W|+b\times|G-W|+c\times|B-W| \quad (2)$$

If $C \geq Thr\#2$ as a result of the calculation with the above formulas, the chromatic color identification unit 64 determines that one or more of the character area, the photographic area, and the screened halftone area of the document d are chromatic. If $C<Thr\#2$, it determines that one or more of the character area, the photographic area and the screened halftone area of the document d are achromatic (For information about the circuit configuration, see FIG. 4).

The image identification processing unit 62 determines whether the character area, the photographic area, or the screened halftone area of the document d is chromatic or achromatic. For example, a 4-bit image identification signal S1 is output to the spatial filter 61, the image identification processing unit 62, the gamma control unit 65, the color conversion unit 66, and the error diffusion unit 67. The spatial filter 61 reads out image data R, G, and B from the image memory 13 and filters the image identification signal S1 input from the image identification processing unit 62. For example, the spatial filter 61 expands the image data R, G, and B and performs edge enhancement for the character area of the document d, smoothing processing for the photographic area of the document d, and moire removal for the screened halftone area of the document d.

The gamma control unit 65 performs gamma adjustment of the image identification signal S1 and the filtered image data R, G, and B upon receiving inputs thereof. For example, the gamma control unit 65 increases the contrast for the character area of the document d and increases the gradations for the photographic and screened halftone areas. The color conversion unit 66 performs a color conversion of the image identification signal S1 and the gamma-controlled image data R, G, and B upon receiving inputs thereof. For example, the color conversion unit 66 converts the image data R, G, and B to printer color materials, Y, M, and C signals for the chromatic areas of the document d. It converts the image data R, G, and B to achromatic BK signals for the achromatic areas of the document d.

The error diffusion unit 67 performs error diffusion processing of the image identification signal S1 and the color-converted image formation data Y, M, C, and BK upon receiving inputs thereof. For example, the error diffusion unit 67 performs lower-bit error diffusion processing for the character area of the document d and higher-bit error diffusion processing for the photographic and screened halftone areas of the document d. The error-diffused image formation data Y, M, C, and BK are output to the image memory 37 or the image formation means 39.

Figure 4:
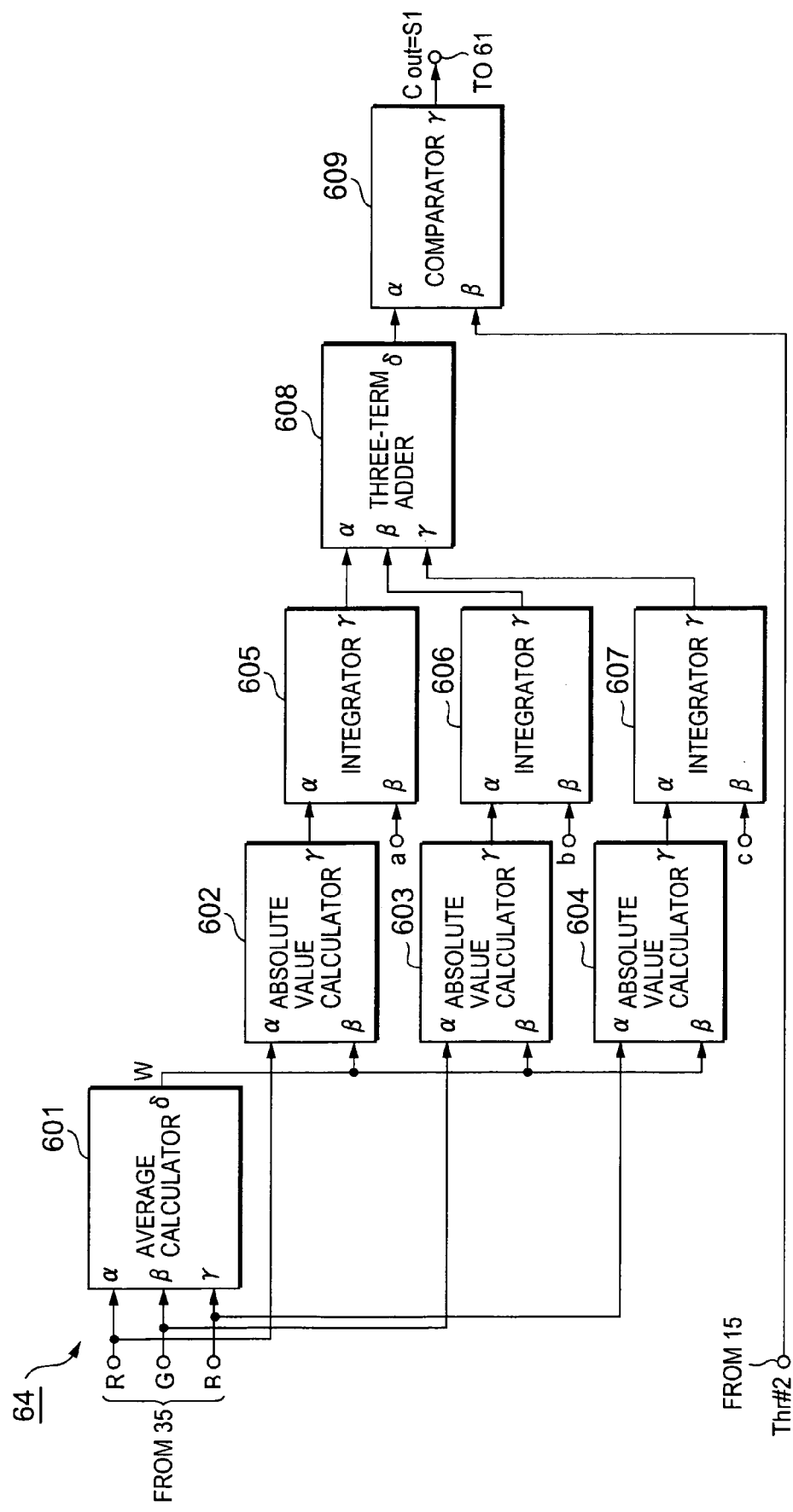
FIG. 4 is a block diagram showing an illustrative internal configuration of a chromatic color identification unit 64.

Referring to FIG. 4, there is shown a block diagram of an illustrative internal configuration of the chromatic color identification unit 64. The chromatic color identification unit 64 in FIG. 4 comprises an average calculator 601, an R-color absolute value calculator 602, a G-color absolute value calculator 603, a B-color absolute value calculator 604, an R-color integrator (multiplier) 605, a G-color integrator 606, a B-color integrator 607, a three-term adder 608, and a comparator 608.

The average calculator 601 computes an average value W on the basis of the formula (1) upon receiving an input of the image data R, G, and B. The average calculator 601 is connected to the R-, G-, and B-color absolute value calculators 602 to 604. The absolute value calculator 602 computes |R−W| in the formula (2) upon receiving inputs of the image data R and the average value W. The absolute value calculator 603 computes |G−W| upon receiving inputs of the image data G and the average value W. The absolute value calculator 604 computes |B−W| upon receiving inputs of the image data B and the average value W.

The absolute value calculator 602 is connected to the R-color integrator 605. The R-color integrator 605 computes a×|R−W| in the formula (2) upon receiving inputs of the absolute value |R−W| and a calculation parameter a. The absolute value calculator 603 is connected to the G-color integrator 606. The integrator 606 computes b×|G−W| in the formula (2) upon receiving inputs of the absolute value |G−W| and a calculation parameter b. The absolute value calculator 604 is connected to the G-color integrator 607. The integrator 607 computes c×|B−W| in the formula (2) upon receiving inputs of the absolute value |B−W| and a calculation parameter c.

The R-, G-, and B-integrators 605 to 607 are connected to the three-term adder 608. The three-term adder 608 adds up a×|R−W|, b×|G−W|, and c×|B−W|. The three-term adder 608 is connected to the comparator 609 to compare a×|R−W|+b×|G−W|+c×|B−W| with the parameter (threshold) Thr#2 in the formula (2) upon receiving inputs thereof. If $C \geq Thr\#2$ in the comparator 609, it is determined that one or more of the character area, the photographic area, and the screened halftone area of the document d are chromatic. If $C<Thr\#2$, it is determined that one or more of the character area, the photographic area, and the screened halftone area of the document d are achromatic. This enables the chromatic color identification unit 64 to separate chromatic areas from achromatic areas of the document d. The chromatic color identification unit 64 outputs a 4-bit image identification signal $C_{out}$=S1 to the spatial filter 61 or the like.

Figure 5:
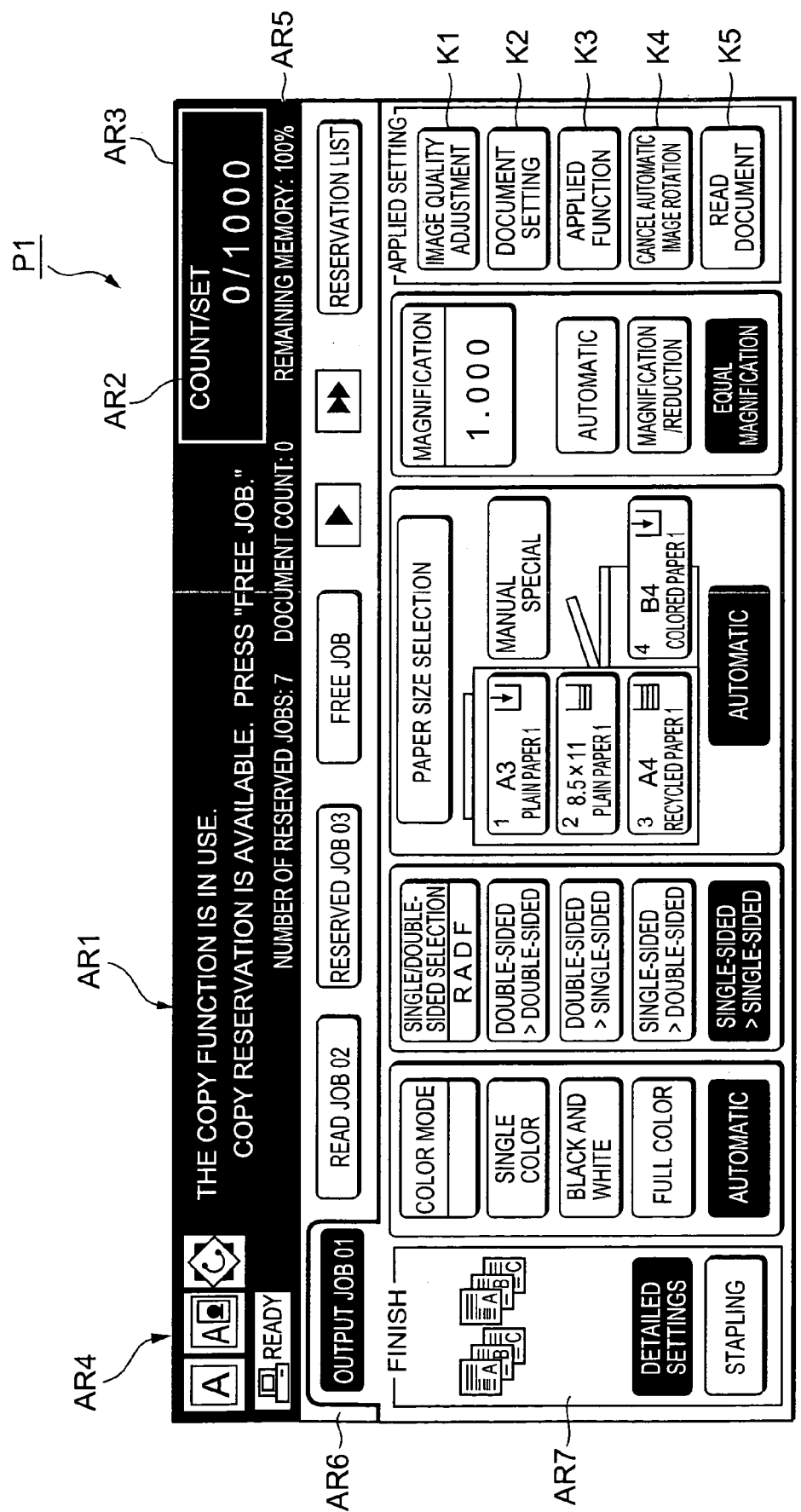
FIG. 5 is an image diagram showing an illustrative display of a basic setting screen P1 on an operation panel 48.

Subsequently, an image processing method of the present invention will be described by using an example of the operation of the color scanner 100. Referring to FIG. 4, there is shown a flowchart of an illustrative operation of the scanner 100. Referring to FIG. 5, there is shown a flowchart of an illustrative image area identification in the image area identification unit 63.

Referring to FIG. 5, there is shown an image diagram of an illustrative display of the basic setting screen P1 on the operation panel 48. The basic setting screen P1 in FIG. 5 is displayed on the operation panel 48 after the power is turned on. The basic setting screen P1 comprises a message area AR1, a status icon display area AR2, a sheet count display area AR3, a various-icon display area AR4, a remaining memory area AR5, a folder button area AR6, and a screen setting display area AR7.

In the message area AR1, a message such as "Copy reservation is available" is displayed. In the screen setting display area AR7, an "applied setting" icon is displayed. For the "applied setting" icon, there are provided keys K1 to K5 for "image quality adjustment," "document setting," "applied function," "cancel automatic image rotation," and "read document." A user can select any of the keys K1 to K5 in the "applied setting" icon at a copy reservation.

If the area identification mode is selected in this embodiment, for example, the "applied function" key K3 is depressed being selected from the "applied setting" icon. The selection of the "applied function" key K3 causes a display of a selection tag: "Do you select the area identification mode? Yes/No" (not shown). If a user selects "Yes," the area identification mode is set.

Referring to FIG. 6, there is shown an image diagram of an illustrative display of the image quality adjustment screen P2 on the operation panel 48. The image quality adjustment screen P2 in FIG. 6 is displayed on the operation panel 48 when the "image quality adjustment" key K1 is depressed being selected from the "applied setting" icon on the basic setting screen P1 shown in FIG. 5. A message such as "Select the setting item" is displayed on the image quality adjustment screen P2. For example, in the various-icon display area AR4, an "applied image quality" tag TG1 is displayed with "image quality adjustment." If the "applied image quality" tag TG1 is selected, the icon screen for the applied image quality P21 is displayed under the message area AR1 and the various-icon display area AR4.

On the icon screen P21, there are displayed setting items of "sharpness," "contrast," "gloss," "screen selection," and "image identification adjustment." As for "sharpness" and "contrast," a term indicating a level of adjustment such as "normal" is displayed. The "image identification adjustment" setting item is provided to set the parameters Thr#1 and the Thr#2 for the image identification processing unit 62 shown in FIG. 3. The user can select the "image identification adjustment" setting item at a copy reservation or the like.

Figure 7:
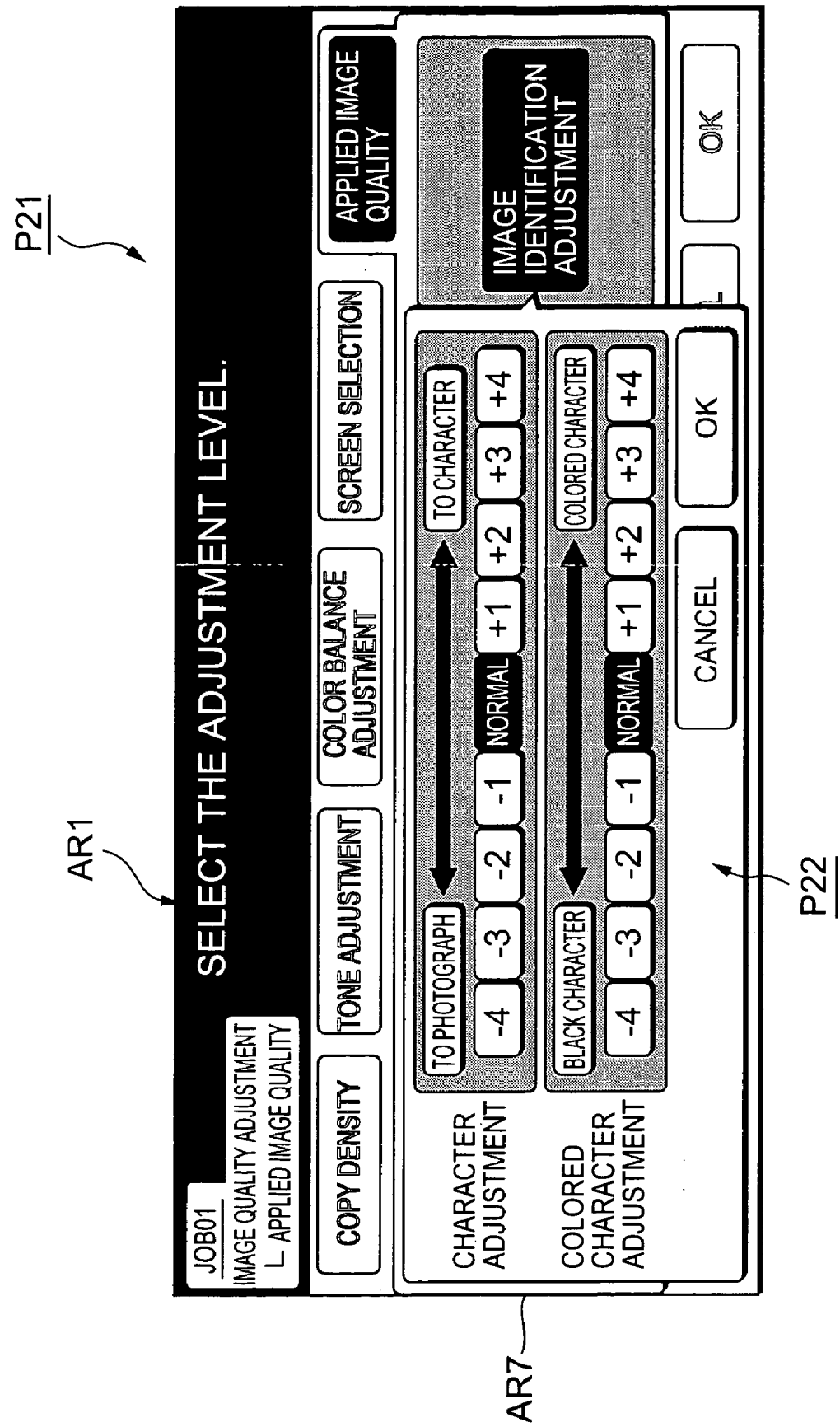
FIG. 7 is an image-diagram showing an illustrative display of an image identification adjustment screen P22 on the operation panel 48.

Referring to FIG. 7, there is shown an image diagram of an illustrative display of the image identification adjustment screen P22 on the operation panel 48. The image identification adjustment screen P22 in FIG. 7 is displayed on the operation panel 48 when the "image identification adjustment" setting item is selected from the "applied image quality" tag TG1 on the icon screen P21 shown in FIG. 6. A message such as "Select the adjustment level" is displayed on the icon screen P21. In the screen setting display area AR7 of the image identification adjustment screen P22, "colored character adjustment" is displayed with "character adjustment." The display is made to set the parameters (thresholds) Thr#1 and Thr#2 for image identification.

The "character adjustment" setting item is an example of the parameter adjustment content and is displayed with the "colored character adjustment" setting item as an example of the second parameter adjustment convent on the same screen (image identification adjustment screen) of the operation panel 48. In the "character adjustment" setting item of the image identification adjustment screen P22, a two-sided arrow is displayed between a term "To photograph" in the leftmost part and a term "To character" in the rightmost part.

Under the center of the two-sided arrow, a "normal" push button is displayed for a level of adjustment. Furthermore, push buttons "+1," "+2," "+3,"and "+4" are displayed toward the extreme right starting from the center, while push buttons "−1," "−2," "−3," and "−4" are displayed toward the extreme left starting from the center. For example, regarding "character adjustment," a user selects some "+" button to increase a rate of the character identification and selects some "−" button to increase a rate of the photographic identification by controlling the push buttons.

Furthermore, in the "colored character adjustment" setting item of the image identification adjustment screen P22, a two-sided arrow is displayed between a term "black character" in the leftmost part and a term "colored character" in the rightmost part. Under the center of the two-sided arrow, a "normal" push button is displayed for a level of adjustment. Furthermore, push buttons "+1," "+2," "+3," and "+4" are displayed toward the extreme right starting from the center, while push buttons "−1," "−2," "−3," and "−4" are displayed toward the extreme left starting from the center. For example, regarding "colored character adjustment," a user selects some "+" button to increase a rate of the colored character identification and selects some "−" button to increase a rate of the black character identification by controlling the push buttons.

The level of adjustment input from the operation panel 48 in this embodiment is output to the CPU 33 as operation data D3 as shown in FIG. 2. The CPU 33 converts the operation data D3, which was generated from the level of adjustment input from the operation panel 48, to the parameters Thr#1 and Thr#2 for the image identification and outputs these parameters Thr#1 and Thr#2 to the image identification processing unit 62. The parameter Thr#1 is for use in switching an image identification level of the image area identification unit 63 and the parameter Thr#2 is for use in switching a color identification level of the chromatic color identification unit 64.

Figure 8A:
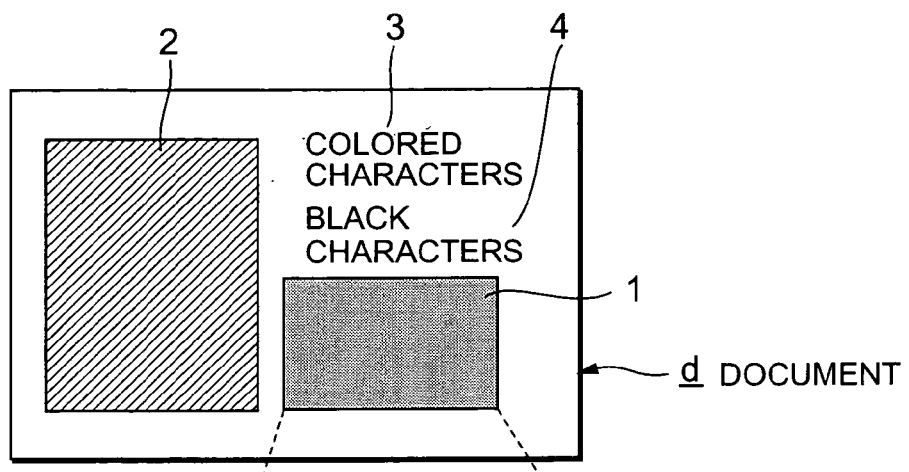
FIGS. 8A and 8B are diagrams showing an illustrative configuration of a document image applied to an area identification mode.
Figure 8B:
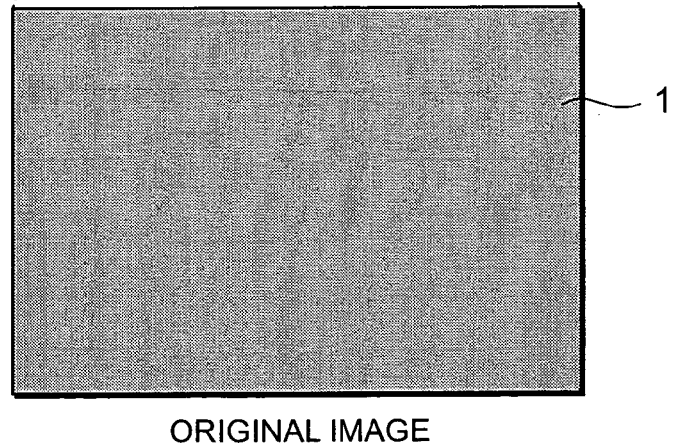

Referring to FIGS. 8A and 8B, there is shown a diagram of an illustrative configuration of a document image applied to the area identification mode.

The document d shown in FIG. 8A includes a photographic image, a screened halftone image, a colored character image, and a black character image. The areas where these images are formed are referred to as a photographic area, a screened halftone area (1), a chromatic character area, and an achromatic character area, respectively. The screened halftone image shown in FIG. 8B is an expanded image of the screened halftone area (1). In this embodiment, an operation of the area identification mode is performed independently of the normal printer mode.

Each picture element of a document image read by the document reading unit 102 falls under one of these four areas. A result of the identification is referenced by the spatial filter unit 61 and the like, by which appropriate image processing is performed for each of the photographic area (2), the screened halftone area (1), the chromatic character area, and the achromatic character area before output.

It has already been described that the identification result is output with different colors classifying the areas in the identification result chart P' by the area type. The output colors are associated with the areas as follows: for example, the screened halftone area (1) is converted to a cyan (C) area, the photographic area (2) is to a colorless area (the same as the color of paper P), the colored character area is to a magenta (M) area, and the black character area is to a black (BK) area. In this embodiment, a density value is controlled for purpose of reducing the toner consumption. A lower density decreases the toner consumption.

In this embodiment, the screened halftone area (1) and the chromatic character area are output in plain colors such as cyan (C) and magenta (M), respectively. Needless to say, the colors are not limited to those, and two or more colors such as red, green, and blue can be used for the expression. If the document image is monochrome, the above result of identification can be divided by giving variations with gray levels.

It is preferable to output the photographic area (2) without any color, though it depends upon a type of the document image. It is because, if the photographic area (2) occupies most of the document image, it is preferable that the image is considered largely the photographic area (2) from the point of view of a reduction of toner consumption and since it is often the case that the base is colorless. This makes it possible to check how the image identification processing unit has identified the photographic area (2), the screened halftone area (1), and the chromatic and achromatic character areas by using the identification result chart P'. The individual parameters Thr#1 and Thr#2 can be adjusted based on the identification result chart P'.

For example, if a target area is a character area, the image identification processing unit detects a portion where the image density sharply increases or decreases. It identifies the image as a character when these portions are detected. To identify the density sharpness, the parameter Thr#1 is applied. If an image required to be a character cannot be identified as a character due to a slightly lower density or the like, a modification of the parameter Thr#1 defining the sharpness facilitates a detection of the character.

Figure 9A:
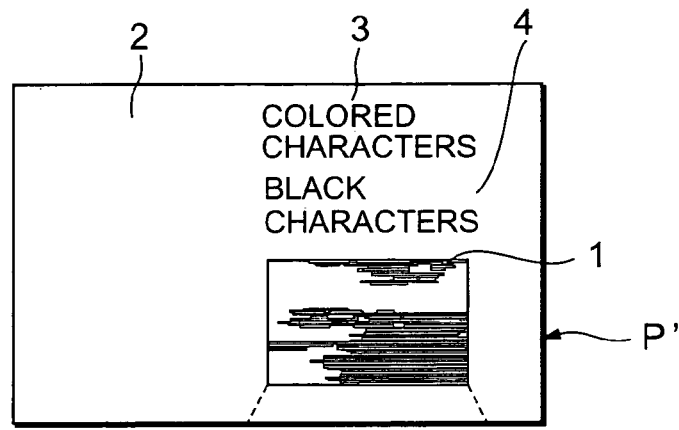
FIGS. 9A and 9B are diagrams showing an illustrative output (1) of an identification result chart P' in the area identification mode.
Figure 9B:

Referring to FIGS. 9A and 9B, there are shown diagrams of an illustrative output (1) of the identification result chart P' in the area identification mode.

The identification result chart P' in FIG. 9A shows an illustrative output in the case of an inappropriate adjustment of the parameter Thr#1. In this illustration, the photographic area (2) is output in the color of paper P reflecting the base color. The colored character area (3) is output after a color conversion to the M color. The black character area (4) is output after a color conversion to the BK color. FIG. 9B is an expanded view of the screened halftone area (1) of FIG. 9A. The "white" portion corresponds to an area not identified as a screened halftone area. The gray (the C color in the color representation) portion corresponds to an area identified as a screened halftone area. The screened halftone area (1) in FIG. 9B is partially identified incorrectly as a part of the photographic area (2), thereby the incorrectly identified part is output in the color of the paper P reflecting the base color and the remaining part is identified as a screened halftone area (1) truly and output after a color conversion to the C color (the screened halftone area (1) is partially gray in the diagram).

Figures 10A, 10B:
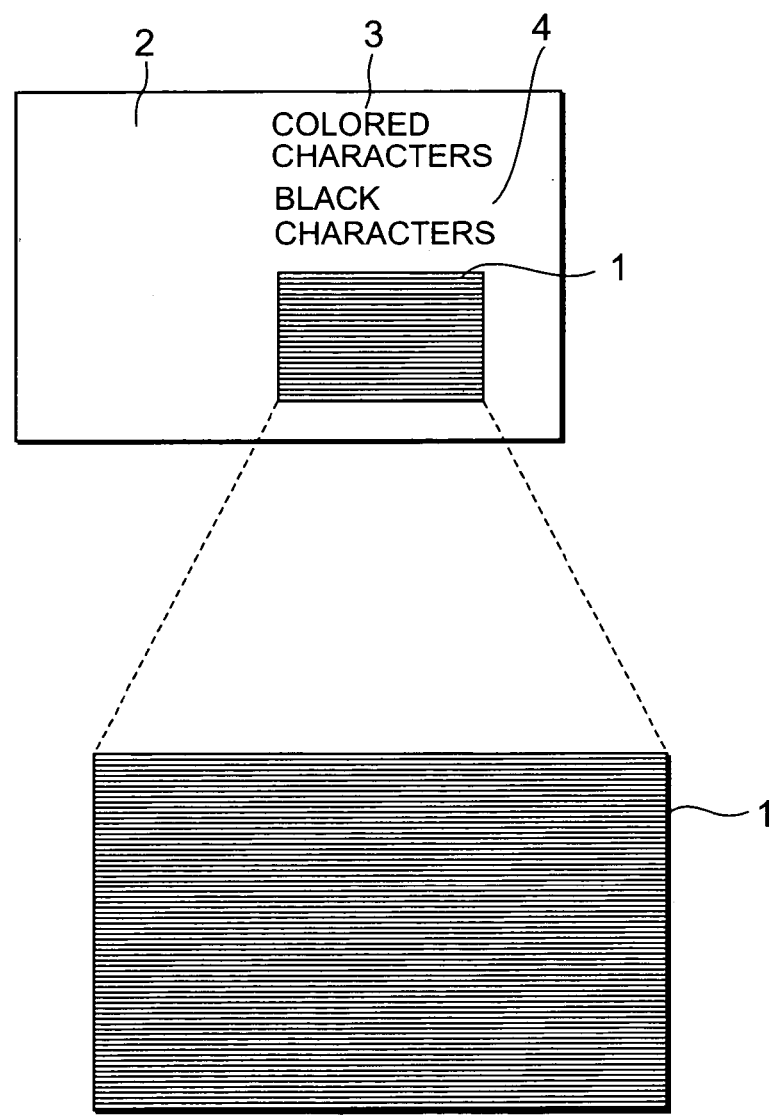
FIGS. 10A and 10B are diagrams showing an illustrative output (2) of the identification result chart P' in the area identification mode.

Referring to FIGS. 10A and 10B, there are shown diagrams of an illustrative output (2) of the identification result chart P' in the area identification mode.

The identification result chart P' in FIG. 10A shows an illustrative output in the case of an optimum adjustment of the parameter Thr#1. In this illustration, the photographic area (2), the colored character area (3), and the black character area (4) are output after the same color conversion as in FIG. 9A. FIG. 10B is an expanded view of the screened halftone area (1) of FIG. 10A. Since the parameter Thr#1 is adjusted to the optimum condition, the screened halftone area (1) in FIG. 10A is identified as the screened halftone area (1) truly and it is output after a color conversion to the C color (the entire area of the screened halftone area (1) is gray in the diagram).

In a manufacturing process or the like of the color image forming apparatus 100, a boundary sample of a test document image is provided and it is read by the document reading unit 102. By checking the corresponding identification result chart P', stable identification processing is achieved with smaller differences between machines.

Figure 11:
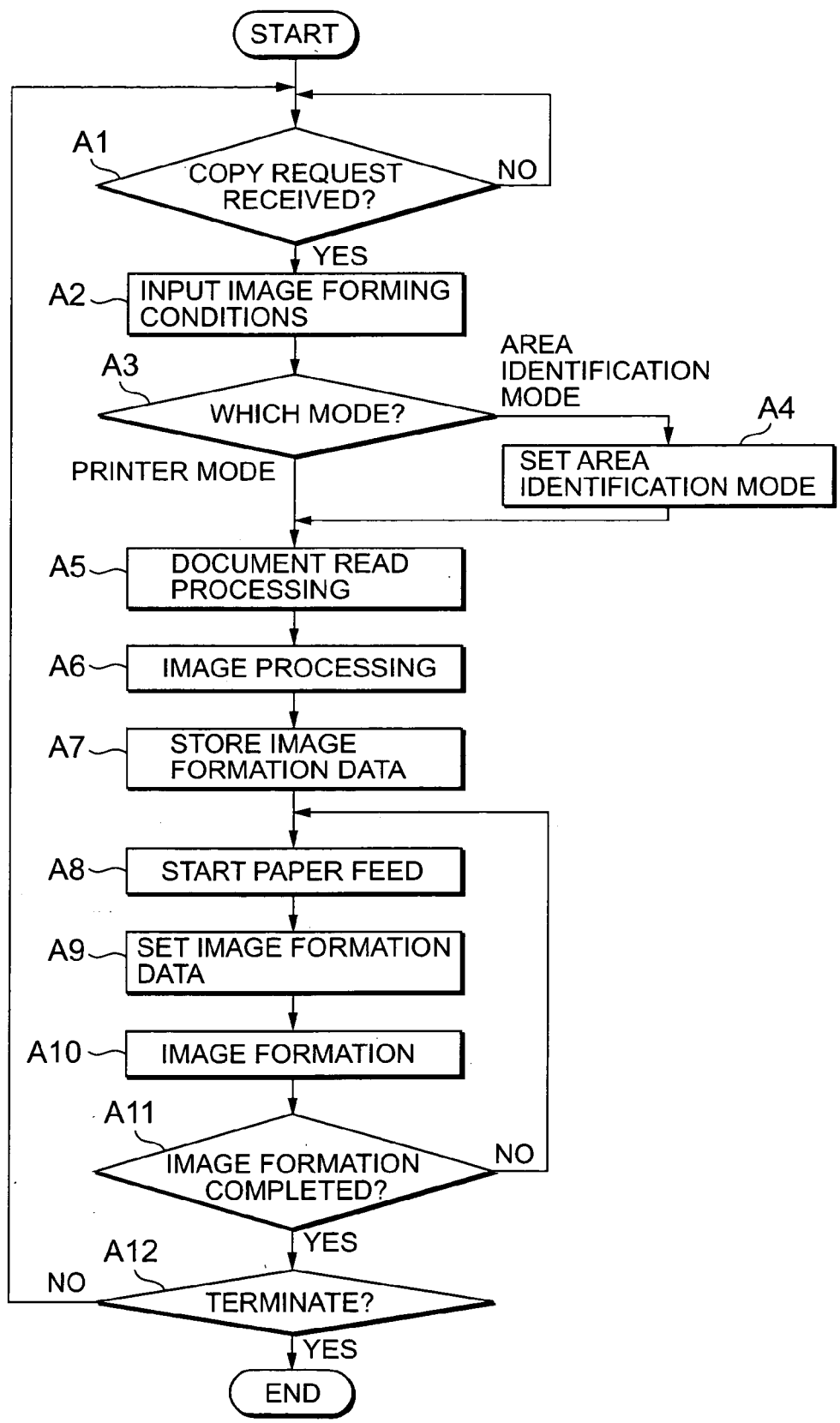
FIG. 11 is a-flowchart (main routine) showing an illustrative operation of the color image forming apparatus 100.
Figure 12:
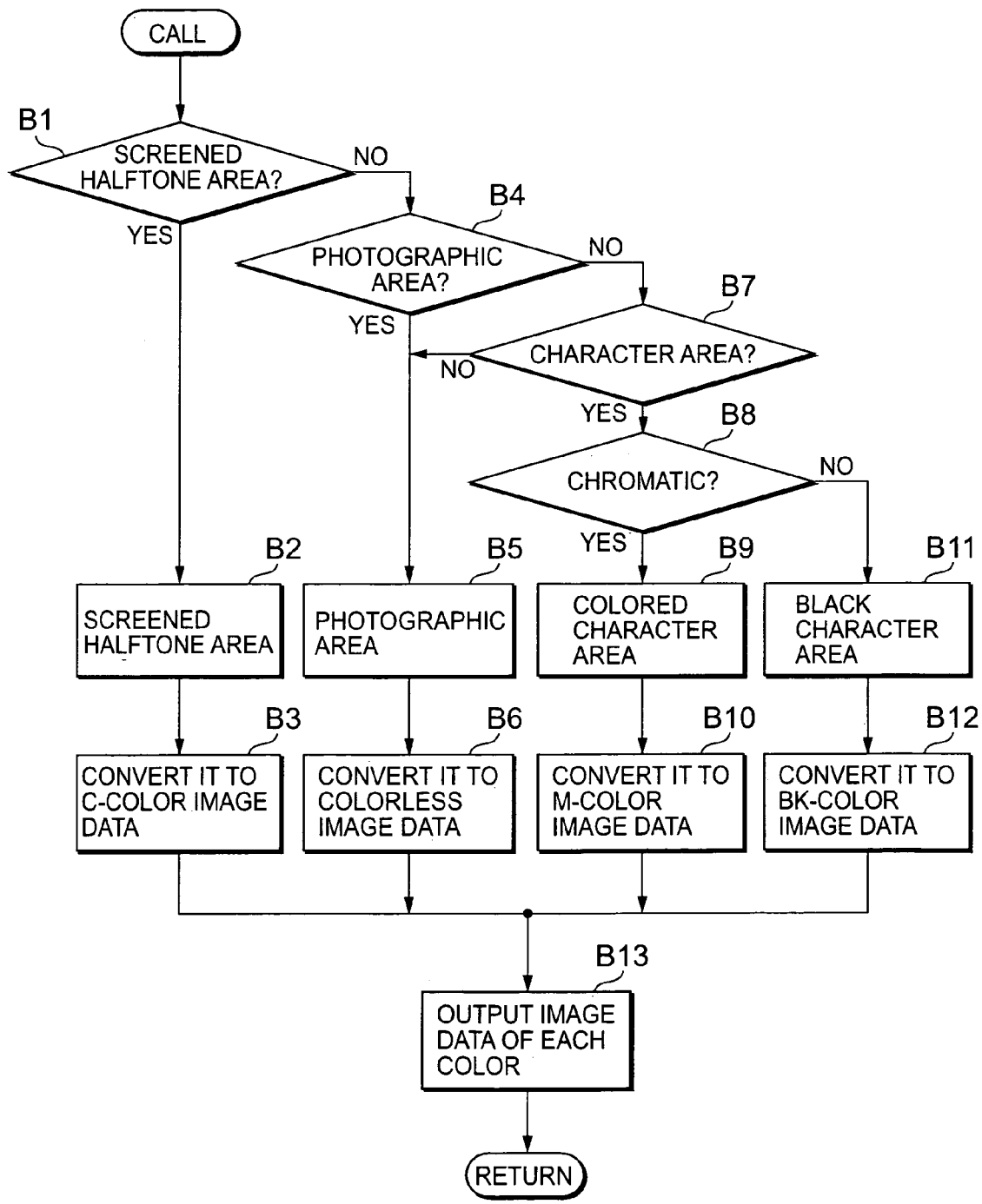
FIG. 12 is a flowchart (subroutine) showing an illustrative area identification processing in the image processing means 36.

The following describes an image processing method in the color image forming apparatus 100. Referring to FIG. 11, there is shown a flowchart (the main routine) of an illustrative operation of the color image forming apparatus 100. Referring to FIG. 12, there is shown a flowchart (a subroutine) of an illustrative area identification processing in the image processing means 36.

In this embodiment, the area identification mode is prepared on the assumption that an image including one of chromatic and/or achromatic characters, a photograph, and halftone dots is to be formed. The embodiment is described below by giving an example of: inputting image data R, G, and B of a document image upon a selection of the area identification mode; identifying the character area, the photographic area (2), and the screened halftone area (1) of the document image and determining whether the character area is chromatic or achromatic; performing image processing according to the chromatic or achromatic character area, the photographic area (2), and the screened halftone area (1) of the document image; and forming and outputting images with colors varying with the area type of the chromatic and achromatic character areas, the photographic area (2), and the screened halftone area (1) in the identification result chart P' on the basis of the image formation data Y, M, C, and K after the image processing.

With these operating conditions, the CPU 33 shown in FIG. 2 is put in a standby state until a copy request is issued in step A1 of the flowchart shown in FIG. 11. Upon receiving the copy request, the control progresses to step A2. In step A2, the CPU 33 inputs image forming conditions from the operation panel 48. In this embodiment, a normal print mode or an area identification mode is set. If the area identification mode is set, a user depresses the key K3 in the "applied setting" icon on the basic setting screen P1 shown in FIG. 5. The depression of the key K3 switches the display from the basic setting screen P1 to an area identification mode selection screen, which is not shown.

Then, the user selects "Yes" on the screen showing "Do you select the area identification mode? Yes/No" to set the area identification mode. Selecting "Yes" on the above area identification mode selection screen causes the control to progress to step A4, thereby setting the "area identification mode."

[Area Identification Mode]

In the area identification mode, the control progresses to step A5, where the document reading unit 102 executes a document reading processing. The document reading unit 102 then reads image information from the document d and outputs analog image signals SR, SG, and SB to the A/D converter 34. The A/D converter 34 converts the analog image signals SR, SG, and SB to digital R-, G-, and B-color image data R, G, and B. The image data R, G, and B are compressed and encoded after shading correction and stored in the image memory 37.

Thereafter, the control progresses to step A6, where the image processing means 36 reads the image data R, G, and B from the image memory 37 to execute image processing. For example, the subroutine shown in FIG. 12 is called and in step B1 of the flowchart the image processing means 36 determines whether the target area of the document d is a screened halftone area (1) or any other area. The target area is moved to the image data R, G, and B of the document d expanded in the image memory 37 by scanning the window. If the target area of the document d is a screened halftone area (1), the control progresses to step B2, where the image processing means 36 determines that the target area is a screened halftone area (1) and extracts image data R, G, and B of the area. All the extracted image data R, G, and B of the screened halftone area (1) are converted to image data C having the cyan (C) color in step B3. Thereafter, the control progresses to step B13.

If the target area is other than the screened halftone area (1) in step B1, the control progresses to step B5, where the image processing means 36 determines whether the target area is a photographic area (2) or a character area. If the target area is a photographic area (2), the control progresses to step B5, where the image processing means 36 determines that the target area is the photographic area (2) and extracts image data R, G, and B of the area. All the extracted image data R, G, and B of the photographic area (2) are converted to achromatic image data K in step B6. Thereafter, the control progresses to step B13.

Unless the target area is the photographic area (2) in step B4, the control progresses to step B7, where the image processing means 36 determines whether the target area is a character area. As stated above, if the target area is an area other than the screened halftone area (1) and the photographic area (2), it is not identified directly as a character area, but intentionally whether the target area is a character area is determined. It is because a noise image can be uniformly converted to a base color by considering an image not identified as a character image such as, for example, a dust or other noise image to be a photographic area (2). Therefore, if the target area is not identified as a character area, the control progresses to step B5 to perform the above processing.

If the target area is a character area, the control progresses to step B8 to determine whether the character area is chromatic or achromatic. If the character area is a chromatic character area, the control progresses to step B9 to extract image data R, G and B of the colored character area (3) from the character area concerned. All the extracted image data R, G, and B of the colored character area (3) are converted to image data M having the magenta (M) color in step B10. Thereafter, the control progresses to step B13.

Unless the character area is chromatic in step B8, in other words, if the character area is achromatic, the control progresses to step B11 to extract image data R, G, and B of the black character area (4) from the character area concerned. All the extracted image data R, G, and B of the black character area (4) are converted to image data K having the black (BK) color in step B12. Thereafter, the control progresses to step B13.

In step B13, image formation data C, M, and K of the color image to be formed in the identification result chart P' are rearranged on the basis of the image formation data C of the target area identified as the screened halftone area (1), image formation data (base color) of the target area identified as the photographic area (2), image data M of the target area identified as the colored character area (3), and image data K of the target area identified as the black character area (4).

Thereafter, the control returns to step A6 of the flowchart of the main routine shown in FIG. 11 and then progresses to step A7. In step A7, the image processing means 36 stores the image formation data C, M, and K of the color image to be formed in the identification result chart P' in the image memory 37 once. Then, the control progresses to step A8, where the CPU 33 starts paper feed processing. At that time, the paper feeding means 30 shown in FIG. 2 feeds out paper P based on the setting of the image forming condition from the paper cassette 20A or the like on the basis of the paper feed control signal S3, and then the paper P is conveyed to the image formation means 39.

Then, the control progresses to step A9, where the CPU 33 reads the image formation data M, C, and K from the image memory 37, screens the image formation data M, C, and K, and sets them to the image forming units 10M, 10C, and 10K. The image formation data M, C, and K set to the image forming units 10M, 10C, and 10K are data in the area identification mode.

Thereafter, the control progresses to step A10, where the image forming units 10M, 10C, and 10K form an image on the basis of the image formation data M, C, and K. In the image formation, the image formation data M goes through pulse width modulation (PWM) in the image forming unit 10M and an M-color laser drive signal after the PWM modulation is supplied to exposure means 3M. In the same manner, the image formation data C and K are PWM-modulated in the image forming units 10C and 10K, and C- and BK-color laser drive signals after the PWM modulation are supplied to exposure means 3C and 3K, respectively.

The exposure means 3M scans a laser beam based on the M-color laser drive signal for the photosensitive drum 1M charged at a given potential. An M-color electrostatic latent image is formed on the photosensitive drum 1M. The developing means 4M develops the electrostatic latent image on the photosensitive drum 1M using M-color toner. This development causes an M-color toner image to be formed on the photosensitive drum 1M. Other exposure means 3C and 3K perform the same processing, thereby causing C- and BK-color toner images to be formed on the photosensitive drums 1C and 1K, respectively.

The images of the respective colors formed by the image forming units 10M, 10C, and 10K are sequentially transferred to the rotating intermediate transfer belt 6 by the primary transfer rollers 7M, 7C, and 7K to which there is applied a primary transfer bias having a reverse polarity to that of the consumed toner (primary transfer), by which a composite color image is formed. The color image is transferred from the intermediate transfer belt 6 to paper P.

The color image transferred to the paper P is fixed by the fixing device 17. It is then held tight by the discharging roller 24 and placed on the discharge tray 25 outside the apparatus. The content of the paper P discharged to the discharge tray 25 is the identification result chart P'. In the identification result chart P', a C-color screened halftone image is formed on the basis of the C-color image data C in the image formation area identified as the screened halftone area (1), while no image is formed on the basis of the colorless image data in the image formation area identified as the photographic area (2).

As for the character area, an M-color character image is formed and output on the basis of the M-color image data M in the image formation area identified as the chromatic area, while a BK-color character image is formed on the basis of the BK-color image data K in the image formation area identified as the achromatic area. Transfer residual toner on peripheral surfaces of the photosensitive drums 1M, 1C, and 1K after the transfer is removed by the image forming members or cleaning means 8M, 8C, and 8K. Then, the apparatus enters the next image formation cycle.

[Normal Printer Mode]

Upon a selection of the printer mode in step A2 of the flowchart shown in FIG. 11 in this embodiment, the parameters Thr#1 and Thr#2 become adjustable. For adjusting the parameters Thr#1 and Thr#2, a user inputs image forming conditions to the CPU 33 by operating the operation panel 48. For example, the user selects the icon screen P21 of the applied image quality. By the selection of the icon screen P21, the image identification adjustment screen P22 shown in FIG. 7 pops up in the icon screen P21 and is displayed on the operation panel 48. In this condition, the user selects some "+" button to increase a rate of the character identification and selects some "−" button to increase a rate of the photographic identification by controlling the push buttons regarding "character adjustment." Furthermore, regarding "colored character adjustment," the user selects some "+"

button to increase a rate of the colored character identification and selects some "–" button to increase a rate of the black character identification by controlling the push buttons.

The level of adjustment input from the operation panel 48 in this manner is output to the CPU 33 as operation data D3 as shown in FIG. 2. The CPU 33 converts the operation data D3 involved in the level of adjustment input from the operation panel 48 to the parameters Thr#1 and Thr#2 for the image identification and outputs these parameters Thr#1 and Thr#2 to the image identification processing unit 62.

Upon a completion of the setting processing for the image forming conditions, the normal printer mode is set in step A3 and the control progresses to step A5. In step A5, the document reading unit 102 executes document read processing. In the execution, the document reading unit 102 reads image information from the document d that the user wants to copy and outputs analog image signals SR, SG, and SB to the A/D converter 34. The A/D converter 34 performs A/D conversion for the analog image signals SR, SG, and SB, thereby converting them to digital R-, G-, and B-color image data R, G, and B. The image data R, G, and B are compressed and encoded after shading correction and are stored in the image memory 37.

Thereafter, the control progresses to step A6, where the image processing means 36 reads the image data R, G, and B from the image memory 37 and executes image processing. For example, the image processing means 36 decompresses and decodes the image data R, G, and B read from the image memory 37 and then identifies one or more of the character area, the photographic area (2), and the screened halftone area (1) of the document d on the basis of the parameter Thr#1. In addition, the image processing means 36 determines whether one or more of the character area, the photographic area (2), and the screened halftone area (1) of the document d is chromatic or achromatic on the basis of the parameter Thr#2. The identification processing is for executing image processing according to the chromatic or achromatic character image, the photographic image or the screened halftone image of chromatic or achromatic color of the document d.

The image processing means 36, for example, expands the image data R, G, and B and performs edge enhancement for the character area of the document d based on the parameter adjustment value, smoothing processing for the photographic area (2) of the document d, and moire removal for the screened halftone area (1) of the document d. The gamma control unit 65 shown in FIG. 3 increases the contrast for the character area of the document d and increases the gradations for the photographic area and the screened halftone area (1) on the basis of the parameter adjustment values.

Furthermore, in the image processing means 36, the color conversion unit 66 converts the image data R, G, and B to printer color materials, Y, M, and C signals for the chromatic areas of the document d. It converts the image data R, G, and B to achromatic BK signals for the achromatic areas of the document d. Upon receiving inputs of the color-converted image formation data Y, M, C, and BK, the error diffusion unit 67 performs lower-bit error diffusion processing for the character area of the document d and higher-bit error diffusion processing for the photographic area and the screened halftone area (1) of the document d.

Then, in step A7, the image processing means 36 stores the image formation data Y, M, C, and K into the image memory 37 once. Thereafter, the control progresses to step A8, where the CPU 33 starts paper feed processing. At that time, the paper feeding means 30 shown in FIG. 2 feeds out paper P based on the setting of the image forming conditions from the paper cassette 20A or the like on the basis of the paper feed control signal S3, and the paper P is conveyed to the image formation means 39.

Thereafter, the control progresses to step A9, where the CPU 33 reads the image formation data Y, M, C, and K from the image memory 37, screens the image formation data Y, M, C, and K, and sets them to the image forming units 10Y, 10M, 10C, and 10K. The image formation data set to the image forming units 10Y, 10M, 10C, and 11K are color-adjusted data based on the image forming conditions preset on the operation panel 48.

Thereafter, the control progresses to step A10, where the image forming units 10Y, 10M, 10C, and 10K form an image on the basis of the image formation data Y, M, C, and K. In the image formation, the image formation data Y goes through pulse width modulation (PWM) in the image forming unit 10Y and a Y-color laser drive signal after the PWM modulation is supplied to exposure means 3Y. In the same manner, the image formation data M, C, and K are PWM-modulated in the image forming units 10M to 10K and M-, C-, and BK-color laser drive signals after the PWM modulation are supplied to exposure means 3M to 3K, respectively.

The exposure means 3Y scans a laser beam based on the Y-color laser drive signal for the photosensitive drum 1Y charged at a given potential. A Y-color electrostatic latent image is formed on the photosensitive drum 1Y. The developing means 4Y develops the electrostatic latent image on the photosensitive drum 1Y using Y-color toner. This development causes a Y-color toner image to be formed on the photosensitive drum 1Y.

Other exposure means 3M to 3K perform the same processing, thereby causing M-, C-, and BK-color toner images to be formed on the photosensitive drums 1M, 1C, and 1K, respectively.

The images of the respective colors formed by the image forming units 10Y, 10M, 10C, and 10K are sequentially transferred to the rotating intermediate transfer belt 6 by the primary transfer rollers 7Y, 7M, 7C, and 7K to which there is applied a primary transfer bias having a reverse polarity to that of the consumed toner (primary transfer), by which a composite color image is formed. The color image is transferred from the intermediate transfer belt 6 to paper P. The color image transferred to the paper P is fixed by the fixing device 17. It is then held tight by the discharging roller 24 and placed on the discharge tray 25 outside the apparatus. Transfer residual toner on peripheral surfaces of the photosensitive drums 1M, 1C, and 1K after the transfer is removed by the image forming members or cleaning means 8M, 8C, and 8K. Then, the apparatus enters the next image formation cycle.

Thereafter in step A11, the CPU 33 determines whether the image formation is completed by the preset number of sets. If not so, the control returns to step A8 to feed out paper P from the paper cassette 20A. Then, in step A9, the image formation data Y, M, C, and BK are set to the image forming units 10Y, 10M, 10C, and 10K. Thereafter, in step A10, images based on the image formation data Y, M, C, and BK are formed on the paper P.

If the image formation is completed by the preset number of sets in step A11, the control progresses to step A12 to check whether to terminate the copy processing. Unless the copy processing is terminated, the apparatus detects power save information and then the control returns to step A1 to await a copy request. If the copy processing is terminated, the apparatus detects power-off information and terminates the control processing.

Therefore, according to the color image forming apparatus as the first embodiment of the present invention, it is possible to treat as color images a chromatic and achromatic character area, a photographic area (2), and a screened halftone area (1) identified in the area identification processing by the image processing means 36 when forming an arbitrary image including one of chromatic and/or achromatic characters, a photography, and the halftone dots. In addition, the image processing means 36 outputs the identification result chart P' showing the area identification result in the image processing means 36 with different colors classifying the areas by the area type.

Therefore, the identification result chart P' output from the image formation means 36 shows images formed in different colors, which represent the chromatic and achromatic character areas, the photographic area (2), and the screened halftone area (1), respectively. A user can visually check easily whether the image processing means 36 has correctly performed the area identification processing (function) on the basis of the color images.

Thereby, unless a user determines that the area identification processing has been correctly performed, the parameter Thr#1 can be adjusted on the spot. Unless the user determines that the chromatic or achromatic color identification processing has been correctly performed, the parameter Thr#2 can be adjusted on the spot, thereby eliminating differences between machines. The parameters Thr#1 and Thr#2 can be adjusted either manually or automatically by causing the control means 15 to determine automatically whether it is OK or NG as described below. In a manufacturing process, the present invention further facilitates the parameter adjustment.

In the first embodiment, the image data of the screened halftone area (1) is converted to cyan (C-color) image data if the area is identified as the screened halftone area (1) in step B1, the image data of the photographic area (2) is converted to colorless image data K if the area is identified as the photographic area (2) in step B4, and the image data of the character area (3) is converted to magenta (M-color) image data in step B10 if the area is identified as the character area (3) in step B7 and further identified as chromatic in step B8. In the present invention, the colors of the image data to be converted are not limited to the above, but can be arbitrary ones.

Furthermore, while only the character area (3) is determined to be chromatic or not in the first embodiment, it is not limited to the character area in the present invention, but any input image can be determined to be chromatic or not, and an area determined to be chromatic as a result of the determination can be converted to image data of an arbitrary color and an area determined to be not chromatic or achromatic can be converted to image data of any other color.

(2) Second Embodiment

Figure 13:
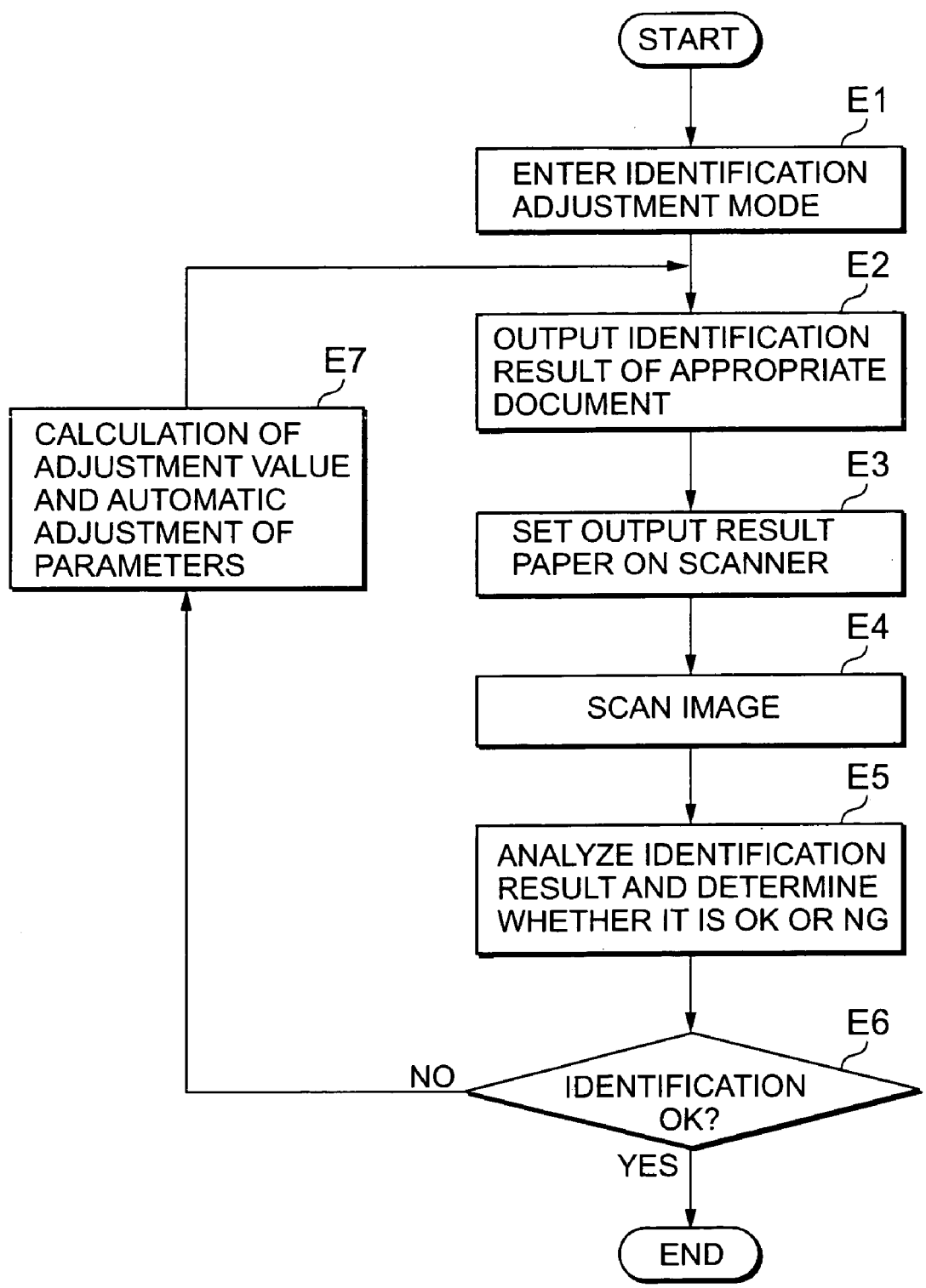
FIG. 13 is a flowchart showing an illustrative image formation as a second embodiment of the present invention.

Referring to FIG. 13, there is shown a flowchart of an illustrative image formation as a second embodiment of the present invention.

In the second embodiment, similarly the color image forming apparatus 100 in FIGS. 1 and 2 is used, the control means 15 automatically determines whether the content of the image formation obtained by reading the identification result chart P' is good or no good (OK/NG) and automatically adjusts the parameters Thr#1 and Thr#2. Items to be adjusted are not only the parameters Thr#1 and Thr#2, but can be parameters for changing image processing by using the identification result chart P', for example, parameters of the spatial filter 61, the gamma control unit 65, the color conversion unit 66, and the error diffusion unit.

In this embodiment, the identification result chart P' output from the image formation means 39 is set on the document reading unit 102 shown in FIG. 1. The document reading unit 102 reads images formed with colors varying with the area type of chromatic and achromatic character areas, a photographic area (2), and a screened halftone area (1) from the identification result chart P'. In this embodiment, image data R, G, and B based on the identification result chart P' output from the document reading unit 102 are input to image processing means 36.

The control means 15 shown in FIG. 2 analyzes images of the chromatic and achromatic character areas, the photographic area (2), and the screened halftone area (1) read from the identification result chart P' and determines whether the area identification processing with the image processing means 36 is good or not. Unless the control means 15 determines that the image processing means 36 has correctly performed the area identification processing, it automatically adjusts the parameters Thr#1 and Thr#2. Naturally, those adjusted by the control means 15 are not limited to the parameters Thr#1 and Thr#2. For example, the control means 15 may adjust one or more of parameters of the spatial filter 61, the gamma control unit 65, the color conversion unit 66, and the error diffusion unit 67 unless it determines that the image processing means 36 has correctly performed the area identification processing. This facilitates a reduction of differences in an area identification result between machines and enables good image qualities.

For example, if a user sets the identification automatic adjustment mode by operating the operation panel 48 in step E1 of the flowchart shown in FIG. 13, the control means 15 enters the identification automatic adjustment mode. The identification automatic adjustment mode is selected to perform an operation of automatically adjusting parameters with analyzing images of the chromatic and achromatic character areas, the photographic area (2), and the screened halftone area (1) read from the identification result chart P'. For example, a selection of the "applied function" key K3 shown in FIG. 5 causes a display of a selection tag: "Do you select the identification automatic adjustment mode? Yes/No" (not shown). If the user selects "Yes," the identification automatic adjustment mode is set.

Then, the control progresses to step E2 to read the document image as described in the first embodiment and to output the identification result chart P'. The user sets the identification result chart P' on the document mounting unit of the document reading unit 102 in step E3. The document reading unit 102 reads (scans) the document d set on the document mounting unit in step E4. Thereafter, the control progresses to step E5, where the control means 15 analyzes images of the chromatic and achromatic character areas, the photographic area (2), and the screened halftone area (1) obtained from the identification result chart P'. The analysis is performed, for example, by detecting the "white" portion not identified as halftone dots and the gray portion identified as halftone dots in the screened halftone area (1) as shown in FIG. 9.

Thereafter, the control progresses to step E6, where the control means 15 determines whether the area identification result with the image processing means 36 is good (OK) or not (NG). An identification reference value for the determination is preset to the control means 15. The determination reference value to be prepared is such a value as achieving, for example, 1:99 as a ratio of the "white" portion not identified as halftone dots to the gray portion identified as halftone dots in the screened halftone area (1) in the above example.

If the identification is OK in step E6, the identification automatic adjustment mode is terminated. If the identification is NG., the control progresses to step E7 to calculate an adjustment value that achieves 1:99 as the ratio of the "white" portion to the gray portion identified as halftone dots and to adjust the parameters Thr#1 and Thr#2 automatically on the basis of the adjustment value. Naturally, those adjusted by the control means 15 are not limited to the parameters Thr#1 and Thr#2, but can be one or more of parameters of the spatial filter 61, the gamma control unit 65, the color conversion unit 66, and the error diffusion unit 67. Thereafter, the control returns to step E2 to check that the parameter adjustment result is correct by repeating the above processing.

Thus, according to the image forming method as the second embodiment of the present invention, the control means 15 automatically determines whether the content of the image formation obtained by reading the determination result chart P' is good or no good (OK/NG) and automatically adjusts the parameters Thr#1 and Thr#2. This facilitates a reduction of differences in the area identification result between machines and enables good image qualities.

As set forth hereinabove, according to the image forming apparatus and the image forming method of the present invention, there is provided an image formation means for identifying character areas, a photographic area, and a screened halftone area of an arbitrary image and forming and outputting images with colors varying with the area type of the chromatic and achromatic character areas, the photographic area, and the screened halftone area to a visual medium on the basis of image information after image processing including processing of determining whether each of the character areas identified above is chromatic or achromatic.

This configuration enables a color image formation of the chromatic and achromatic character areas, the photographic area, and the screened halftone area identified by the image processing means. Furthermore, a user can visually check whether the image processing means has correctly performed the area identification processing on the basis of the color images formed with different colors on a visual medium. Thereby, unless the area identification processing has been correctly performed, the identification reference value for the area identification can be adjusted on the spot. Unless the chromatic or achromatic color identification processing has been correctly performed regarding the character areas, the identification reference value for the color identification can be adjusted on the spot.

The present invention is greatly preferred to be applied to a color printer, a color digital copying machine, a complex machine, or the like having an image area identification and adjustment function for identifying image areas and adjusting image data.

What is claimed is:

1. A color image forming apparatus, comprising:
   a first identification unit to identify an area of an input image as one of a character area, a photographic area, and a screened halftone area, based on image data obtained from the area of the input image and an identification reference value;
   an output unit to output one of a character area identification signal, a photographic area information signal, and a screened halftone information signal based on an output of the first identification unit for each identified area;
   a recording unit to form an image for each identified area to be a respective single color based on the signal output by the output unit for each said identified area; and
   an operation setting unit to set the identification reference value.

2. The color image forming apparatus according to claim 1, further comprising a second identification unit to identify the character area as one of a chromatic character area and an achromatic character area.

3. The color image forming apparatus according to claim 2, further comprising a gradation processing unit to gradation-process image information of the achromatic character area.

4. The color image forming apparatus according to claim 2, wherein the first identification unit has a first identification reference value and the second identification unit has a second identification reference value, and wherein the color image forming apparatus further comprises an operation setting unit to set the first and second identification reference values.

5. The color image forming apparatus according to claim 1, further comprising a specification unit to specify the respective single color for each said identified area.

6. The color image forming apparatus according to claim 1, wherein the input image is obtained by reading a document with a document reading device.

7. The color image forming apparatus according to claim 1, further comprising a control unit to determine whether the output of the first identification unit is accurate, is accurate.

8. The color image forming apparatus according to claim 7, further comprising an adjustment unit to automatically adjust the identification reference value based on control signals output from the control unit.

9. The color image forming apparatus according to claim 8, wherein the adjustment unit comprises at least one of a spatial filter adjustment unit, a gamma control unit, a color conversion adjustment unit, and an error diffusion adjustment unit.

10. A color image forming apparatus, comprising:
    an identification unit to identify an area of an input image as one of a chromatic character area and an achromatic character area, based on image data obtained from the area of the input image and an identification reference value;
    an output unit to output one of a chromatic character area identification signal and an achromatic character area identification signal based on an output of the identification unit for each identified area;
    a recording unit to form an image for each identified area with a respective single color which corresponds to the signal output by the output unit for each said identified area; and
    an operation setting unit to set the identification reference value.

11. The color image forming apparatus according to claim 10, further comprising a specification unit to specify the respective single color for each said identified area.

12. The color image forming apparatus according to claim 10, further comprising a gradation processing unit to gradation-process image information of the achromatic character area.

13. The color image forming apparatus according to claim 10, wherein the input image is obtained by reading a document with a document reading device.

14. The color image forming apparatus according to claim 10, further comprising a control unit to determine whether the output of the identification unit is accurate.

15. The color image forming apparatus according to claim 14, further comprising an adjustment unit to automatically adjust the identification reference value based on control signals output from the control unit.

16. The color image forming apparatus according to claim 15, wherein the adjustment unit comprises at least one of a spatial filter adjustment unit, a gamma control unit, a color conversion adjustment unit, and an error diffusion adjustment unit.

17. A color image forming method, comprising:
identifying an area of an input image as one of a character area, a photographic area, and a screened halftone area, based on image data obtained from the area of the input image and an identification reference value, said identification reference value being settable via an operation setting unit;
outputting one of a character area identification signal, a photographic area information signal, and a screened halftone information signal based the identification of each identified area; and
recording an image for each identified area to be a respective single color based on the output signal for each said identified area.

18. The color image forming method according to claim 17, further comprising identifying the character area as one of a chromatic character area and an achromatic character area.

19. A color image forming method, comprising:
identifying an area of an input image as one of a chromatic character area and an achromatic character area, based on image data obtained from the area of the input image and an identification reference value, said identification reference value being settable via an operation setting unit;
outputting one of a chromatic character area identification signal, and an achromatic character area information signal; and
recording an image for each identified area to be a respective single color based on the output signal for each said identified area.

20. A color image forming apparatus, comprising:
a first identification unit to identify an area of an input image as one of a character area, a photographic area, and a screened halftone area, based on image data obtained from the area of the input image and an identification reference value;
an output unit to output one of a character area identification signal, a photographic area information signal, and a screened halftone information signal based on an output of the first identification unit for each identified area;
a recording unit to form an image based on the input image;
a controller to control the recording unit to form an image for each identified area to be a respective single color based on the signal output by the output unit for each said identified area, when an area identification mode is selected; and
an operation setting unit to set the identification reference value.

21. A color image forming apparatus, comprising:
an identification unit to identify an area of an input image as one of a chromatic character area and an achromatic character area, based on image data obtained from the area of the input image and an identification reference value;
an output unit to output one of a chromatic character area identification signal and an achromatic character area identification signal based on an output of the identification unit for each identified area;
a recording unit to form an image based on the input image;
a controller to control the recording unit to form an image for each identified area to be a respective single color based on the signal output by the output unit for each said identified area, when an area identification mode is selected; and
an operation setting unit to set the identification reference value.

* * * * *